US011887590B2

(12) United States Patent
D'Souza et al.

(10) Patent No.: US 11,887,590 B2
(45) Date of Patent: Jan. 30, 2024

(54) VOICE ENABLEMENT AND DISABLEMENT OF SPEECH PROCESSING FUNCTIONALITY

(71) Applicant: Amazon Technologies, Inc., Seattle, WA (US)

(72) Inventors: Shaman D'Souza, Seattle, WA (US); Ian Suttle, Seattle, WA (US); Srikanth Nori, Seattle, WA (US); Rajiv Reddy, Seattle, WA (US); Amol Kanitkar, Seattle, WA (US); Tina Orooji, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/030,451

(22) Filed: Sep. 24, 2020

(65) Prior Publication Data
US 2021/0104238 A1 Apr. 8, 2021

Related U.S. Application Data

(63) Continuation of application No. 16/447,426, filed on Jun. 20, 2019, now Pat. No. 10,803,869, which is a continuation of application No. 15/194,453, filed on Jun. 27, 2016, now Pat. No. 10,332,513.
(Continued)

(51) Int. Cl.
| | |
|---|---|
| *G10L 15/22* | (2006.01) |
| *G10L 15/06* | (2013.01) |
| *G10L 15/183* | (2013.01) |
| *G10L 15/26* | (2006.01) |
| *H04M 3/00* | (2006.01) |
| *G10L 17/00* | (2013.01) |

(52) U.S. Cl.
CPC ............ *G10L 15/22* (2013.01); *G10L 15/063* (2013.01); *G10L 15/183* (2013.01); *G10L 15/26* (2013.01); *G10L 17/00* (2013.01); *G10L 2015/0635* (2013.01); *G10L 2015/223* (2013.01); *G10L 2015/225* (2013.01); *H04M 3/00* (2013.01)

(58) Field of Classification Search
CPC ...................................................... G10L 15/22
See application file for complete search history.

(56) References Cited

U.S. PATENT DOCUMENTS

| | | | |
|---|---|---|---|
| 2013/0124207 A1* | 5/2013 | Sarin ....................... | G06F 3/167 |
| | | | 704/E11.001 |
| 2019/0311715 A1* | 10/2019 | Pfeffinger ............... | G10L 17/22 |

* cited by examiner

*Primary Examiner* — Feng-Tzer Tzeng
(74) *Attorney, Agent, or Firm* — Pierce Atwood LLP

(57) ABSTRACT

Methods and devices for enabling and disabling applications using voice are described herein. In some embodiments, an individual speak an utterance to their electronic device, which may send audio data representing the utterance to a backend system. The backend system may generate text data representing the utterance, and may determine that an intent of the utterance was for an application to be enabled or disabled for their user account on the backend system. If, for instance, the intent was to enable the application, the backend system may receive one or more rules for performing functionalities of the application, as well as one or more sample templates of sample utterances and sample responses that future utterances may use when requesting the application. Furthermore, one or more invocation phrases that may be used within the future utterances to invoke the application may be received, along with slot values for the sample templates.

16 Claims, 14 Drawing Sheets

VOICE ENABLEMENT AND DISABLEMENT OF SPEECH PROCESSING FUNCTIONALITY

CROSS REFERENCE TO RELATED APPLICATION

This application is a continuation of, and claims the benefit of priority of, U.S. Non-provisional patent application Ser. No. 16/447,426, filed Jun. 20, 2019 and entitled "VOICE ENABLEMENT AND DISABLEMENT OF SPEECH PROCESSING FUNCTIONALITY", and which is a continuation of, and claims the benefit of priority of, U.S. Non-provisional patent application Ser. No. 15/194,453, filed Jun. 27, 2016 and entitled "VOICE ENABLEMENT AND DISABLEMENT OF SPEECH PROCESSING FUNCTIONALITY," which issued as U.S. Pat. No. 10,332,513 on Jun. 25, 2019. The contents of each of which is expressly incorporated herein by reference in its entirety.

BACKGROUND

Voice activated electronic devices are capable of performing various functionalities. An individual speaks a command to activate such a device and in response, the device performs various functions, such as outputting audio.

DETAILED DESCRIPTION

Figure 1A:
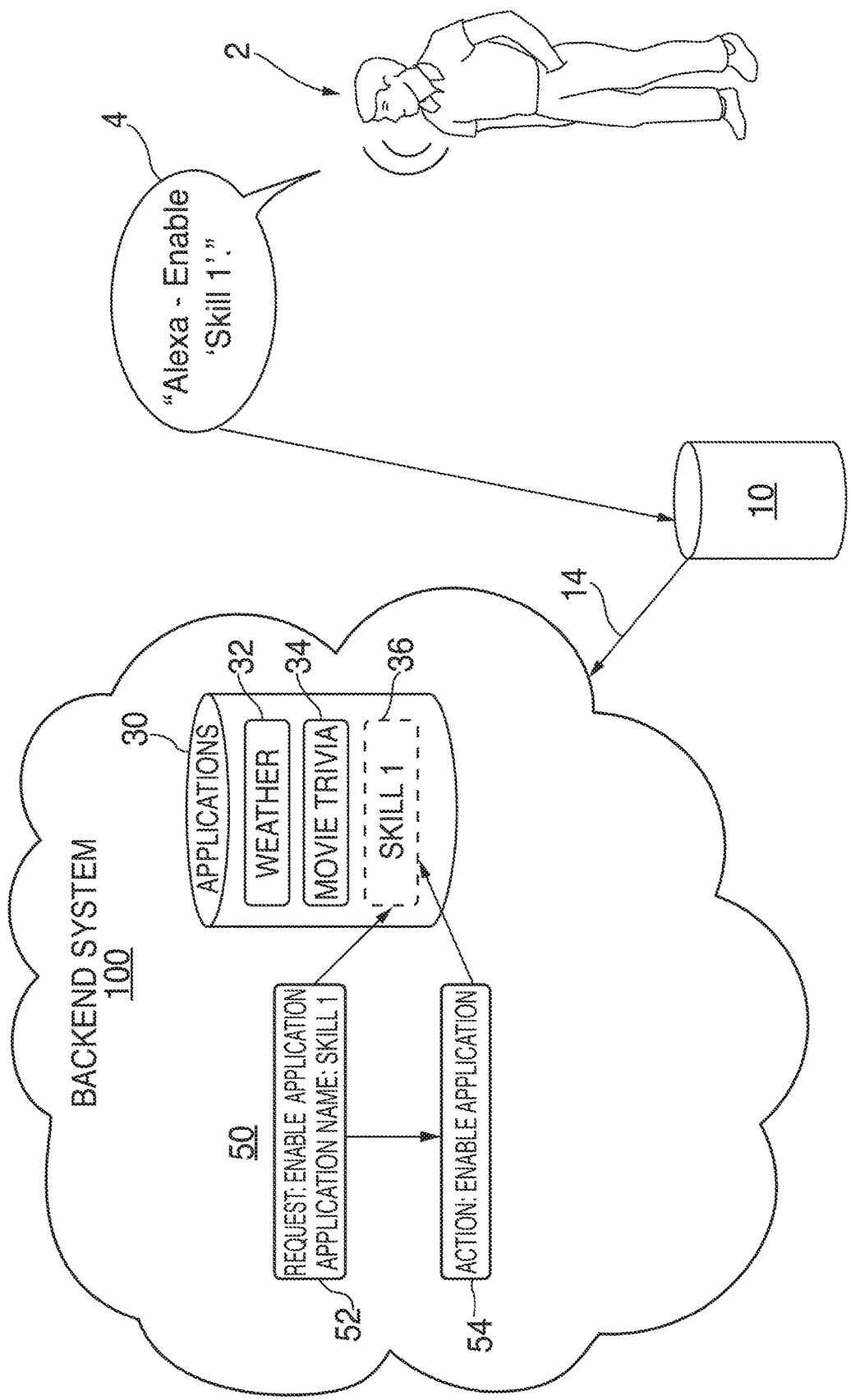
FIGS. 1A and 1B are illustrative diagrams of systems for enabling an application using speech, in accordance with various embodiments.

The present disclosure, as set forth below, is generally directed to various embodiments of methods and devices for enabling and/or disabling various functionalities for a user account in response to an utterance. An individual may, in a non-limiting embodiment, speak an utterance to a requesting device in communication with a backend system that allows the individual to receive content and/or have one or more actions occur. Some content and/or some actions, however, may require the backend system to have stored thereon certain rules, conditions, and/or instructions, as well as access one or more databases or other types of information sources, in order to provide responses to the requesting device and/or perform actions.

The backend system, for instance, may include one or more first party applications, which may also be referred to as skills, functionalities, and/or capabilities. The backend system may also be in communication with one or more third party applications. The first party application(s) and/or the third party application(s) may be capable of providing a requesting device with desired content and/or causing particular actions to occur. To use the first and/or third party applications, a user account may need to have access to those applications associated functionalities. Individuals may invoke these functionalities, in some embodiments, by speaking an utterance that requests that a particular application, having certain functionalities, be enabled. Conversely, individuals may disable certain functionalities by speaking an utterance that requests that a particular application be disabled.

Applications may be enabled or disabled in response to manual inputs as well. For instance, an individual may choose to enable a particular application on their touch-based electronic device by downloading a local client application to their touch-based electronic device. The local client application may be configured to communicate with a web-based server, which allows an individual to perform various functions associated with the web-based server locally through the client application. However, for sound controlled electronic devices, such as voice activated electronic devices, individuals may primarily interact with these devices via speech. Therefore, individuals may seek to enable the functionalities of certain applications using speech. While downloading a local client application to, or activating a local client application with, one's touch-based electronic device may be possible, switching from using an individual's sound controlled electronic device to their touch-based electronic device and then back again may detract from the overall experience of the sound controlled electronic device.

Prior to requesting that certain functionalities be performed by, or accessed using, an individual's sound controlled electronic device, an application may need to be enabled for the individual's user account on a backend system. As an illustrative example, enablement of applications may be somewhat akin to downloading a local client application on one's touch-based electronic device, albeit enabling an application on one's sound controlled electronic device may allow an individual to obtain content or otherwise harness that application using speech. Therefore, many additional complexities can arise that are not typically associated with non-sound based systems.

In some embodiments, an individual may speak an utterance to their sound controlled electronic device, which may be in communication with a backend system. The individual may have a user account on the backend system, which may allow the individual to access various functionalities of the backend system. For instance, the individual may receive content from the backend system at their sound controlled electronic device, and/or cause certain actions to be performed by the backend system in response to particular commands uttered by the individual to their sound controlled electronic device. For example, an individual may say an utterance, "Alexa—What is the weather?", and may be provided with an audio message and/or video of a current weather forecast for their geographical location. The various functionalities of the backend system that are available for an individual may be stored by the individual's user account. As mentioned previously, if an application's functionalities are not currently available, the individual may ask that the application be enabled for their user account. This may allow the individual to speak subsequent utterances that may be responded to using that application's functionalities. For instance, an individual may say an utterance, "Alexa— Enable 'My Weather Information' Application." In response, one or more functionalities and/or capabilities of the application, "My Weather Information," may be enabled for the individual's user account. Thus, if, at a later time, the individual says, "Alexa—Ask 'My Weather Information' Application for the weather," the individual may be able to receive, at their sound controlled electronic device, a current weather forecast from the application, "My Weather Information."

In some embodiments, audio data representing the utterance (e.g., "Alexa—Enable 'My Weather Information' Application") may be sent from the sound controlled electronic device to the backend system. Upon receipt, the backend system may be configured to generate text data representing the audio data using automatic speech recognition functionality resident on the backend system. The text data may then be provided to natural language understanding functionality to determine an intent of the utterance, as well as one or more likely applications that may be used to respond to the intent. For example, the natural language understanding functionality may determine that the intent corresponds to a particular application having a particular application name (e.g., an application named, "My Weather Information"). As another example, the determined intent may correspond to a particular subject matter or category (e.g., application(s) corresponding to the subject, "weather").

After the intent is determined, a determination may be made that the utterance includes a name of the application, or a word that may correspond to a name for the application, and an applications database may be queried to determine which applications most likely to correspond to that intent. In some embodiments, similarity values may be determined for the application name and each application name included on the applications database. If one or more similarity values are determined to be greater than a similarity threshold value, then the corresponding application(s) may be selected as the most probable applications that were requested to be enabled. If there are multiple (e.g., two or more applications) that exceed the similarity threshold value, then a selection may be needed of the appropriate application. In some embodiments, a response may be selected from a pre-set response list that asks for the individual to select one of the applications. In some embodiments, the response may also include an instruction for how to enable, or conversely disable, one of the application. Text data representing the response may be generated, and audio data representing the text data may be generated using text-to-speech functionality. The audio data may then be sent to the requesting sound controlled electronic device, such that one or more speakers of, or in communication with, the requesting sound controlled electronic device may output an audio message of the response. Continuing the previous example, the audio message may be, "Three different applications were found: 'My Weather,' 'Weather Information,' and 'My Weather Information.' To enable 'My Weather,' say: 'Alexa—Enable 'My Weather' Application. To enable 'Weather Information,' say 'Alexa—Enable 'Weather Information' Application. To enable 'Weather Information,' say: 'Alexa—Enable Enable 'My Weather Information' Application."

In some embodiments, an instruction may also be generated and sent to the requesting sound controlled electronic device that causes the sound controlled electronic device to continue sending audio data representing local audio received after the audio message outputs. In this particular scenario, the individual may not need to say the wakeword again. For example, in response to receiving the audio message, "Three different applications were found: 'My Weather,' 'Weather Information,' and 'My Weather Information,'" the individual may speak an additional utterance to select one of the applications, such as "My Weather Information." Therefore, audio data representing the additional utterance may be received by the backend system, which in turn may generate text data representing that audio data, which may be used to determine an intent of the additional utterance. Thus, the individual is able to select the correct application from one or more "matching" applications.

If, however, only a single application has a similarity value in excess of the similarity threshold, then that application's functionalities may be enabled for the user account. This may correspond to generating an updated language model for the user account. The updated language model may update a language model for the user account such that it now includes one or more invocation phrases being added to the individual's user account that may be used for invoking the application. Furthermore, one or more sample utterance templates, including one or more slots, fields, or placeholders may be added to the language model such the updated language module is capable of determining whether an additional utterance has a same format of one of the sample utterance templates for that application. Additionally, one or more sample response templates, including one or more response slots, fields, or placeholders, may be added to the individual's language model such that the updated language model is capable of selecting one of the sample response templates to use for responding to a subsequent utterance associated with that application. Still further, the updated language model may include one or more slot, field, or placeholder values for the application, to be used with one of the application response slots, fields, or placeholders.

In some embodiments, prior to enabling an application, a response may be selected from the pre-set response list that asks for the individual to confirm the selection. In some embodiments, this response may reiterate the determined application's name back to the individual such that the individual may confirm whether the correct application was identified. Text data representing this response may then be generated, and audio data representing this text data may be generated using the text-to-speech functionality. This audio data may then be sent to the requesting sound controlled electronic device such that an audio message of the response may be output. For example, the requesting electronic device may output the audio message, "Do you want to enable 'My Weather Information'?" Additionally, the backend system may also generate and send an instruction to the requesting electronic device that causes the requesting electronic device to continue sending audio data representing local audio received after the audio message outputs. For example, in response to the audio message, and individual may speak an additional utterance to confirm that the correct application is being selected, such as "Yes." Audio data representing the additional utterance may be received by the backend system, which in turn may generate text data representing that audio data, and the intent of the additional utterance may be determined. Therefore, the application entitled, "My Weather Information," may be enabled for the individual's user account. However, in some embodiments, no instruction may be sent. In this particular instance, the audio message may be, "If you want to enable 'My Weather Information,' please say, 'Alexa—Enable 'My Weather Information'." Thus, the individual, in the exemplary embodiment, may activate their sound controlled electronic device again by uttering the wakeword, "Alexa," followed by the invocation, "Enable 'My Weather Information'."

In some embodiments, an additional response may be provided to the requesting sound controlled electronic device that informs the individual that the application has been enabled. The additional response may be selected from the pre-set response list, for instance, and text data representing the additional response may be generated, and audio data representing this text data may also be generated. The audio data may be sent to the requesting electronic device such that an additional audio message of the additional response is output by the sound controlled electronic device. For example, the audio message, "Ok. 'My Weather Information' is now enabled," may be output by the sound controlled electronic device.

In some embodiments, a similar process may also be used to disable one or more applications. For instance, an individual may say the utterance, "Disable 'My Weather Information'." In this particular scenario, the backend system may determine that an intent of the utterance is to disable the functionality of an application entitled, 'My Weather Information,' and may query the applications database for applications associated with that application name. If an application is found to match that application name, then the backend system may disable the functionalities of that application. For instance, the backend system may generate an updated language model for the user account associated with the sound controlled electronic device, such that a previous language model for the user account has one or more invocation phrases, one or more sample utterance templates, one or more sample response templates, and/or one or more slot, field, or placeholder values for the application removed. If, however, more than one application are found that matches that application name, then a response asking to select one of those applications, as well as instruction of how to disable that application, may be determined, and text data representing the response, and audio data representing the text data, may be generated. The audio data may then be sent to the requesting electronic device such that an audio message is output by the requesting sound controlled electronic device. For example, the audio message may be, "Three different applications were found: 'My Weather,' 'Weather Information,' or 'My Weather Information'. To disable 'My Weather,' say 'Alexa—Disable 'My Weather' Application.' To disable 'Weather Information,' say 'Alexa—Disable 'Weather Information' Application.' To disable 'My Weather Information,' say 'Alexa—Disable 'My Weather Information' Application'."Furthermore, in some embodiments, the backend system may also generate and send an instruction to the requesting electronic device that causes the requesting electronic device to continue sending audio data representing local audio received after the audio message outputs. For example, in response to hearing the audio message, an individual may say an additional utterance, "Alexa—Disable 'My Weather Information'." Audio data representing the additional utterance may be received by the backend system, which in turn may generate text data representing that audio data. In response to determining that an intent of the additional utterance is for one of the applications to be disabled, then that application's functionality may be disabled for the individual's user account.

In some embodiments, a response that asks for the individual to confirm that the application is to be disabled may be determined, and text data representing the response, and audio data representing the text data, may be generated. This response may reiterate the determined application's name back to the individual such that the individual may confirm whether the correct application is going to be disabled, as well as verifying that the individual seeks to disable the application. The audio data may then be sent to the requesting sound controlled electronic device such that an audio message of this response is output by the sound controlled electronic device. For example, the sound controlled electronic device may output the audio message, "Do you want to disable 'My Weather Information'?" Additionally, the backend system may also generate and send an instruction to the requesting sound controlled electronic device that causes the sound controlled electronic device to continue sending audio data representing local audio received after the audio message outputs. For example, in response to receiving the audio message, and individual may speak an additional utterance to confirm (or, alternatively, not confirm) that he/she would like to disable the application, such as by saying "Yes." Audio data representing the additional utterance may be received by the backend system, which in turn may generate text data representing that audio data, and the intent of the additional utterance may be determined. Therefore, the application entitled, "My Weather Information," may be disabled for that individual's user account. However, in some embodiments, no instruction may be sent. In this particular instance, the audio message may be, "If you want to disable 'My Weather Information,' please say, 'Alexa—Disable 'My Weather Information'." Thus, the individual, in the exemplary embodiment, may activate their sound controlled electronic device again by uttering the wakeword, "Alexa," followed by the invocation, "Disable 'My Weather Information'."

In some embodiments, an additional response may be provided to the requesting sound controlled electronic device that informs the individual that the application has been disabled. The additional response may be selected from the pre-set response list, for instance, and text data representing the additional response may be generated, and audio data representing this text data may also be generated. The audio data may be sent to the requesting sound controlled electronic device such that an additional audio message of the additional response is output. For example, the audio message, "Ok. Disabling 'My Weather Information'," may be output by the requesting sound controlled electronic device.

A sound controlled electronic device, as described herein, may correspond to any device capable of being activated in response to detection of a specific word (e.g., a word, a phoneme, a phrase or grouping of words, or any other type of sound, or any series of temporally related sounds). For example, a voice activated electronic device is one type of sound controlled electronic device. Such voice activated electronic devices, for instance, are capable of generating and sending audio data to a backend system, such as the backend system mentioned previously, in response to detecting a wakeword.

Spoken voice commands, in some embodiments, may be prefaced by a wakeword, which may also be referred to as a trigger expression, wake expression, or activation word. In response to detecting an utterance of the wakeword, a voice activated electronic device may be configured to detect and interpret any words that subsequently follow the detected wakeword as actionable inputs or commands. In some embodiments, the voice activated electronic device may be activated by a phrase or grouping of words, which the voice activated electronic device may also be configured to detect. The voice activated electronic device, therefore, may also be able to detect and interpret any words subsequently following that phrase or grouping of words.

As used herein, the term "wakeword" may correspond to a "keyword" or "key phrase," an "activation word" or "activation words," or a "trigger," "trigger word," or trigger expression." One exemplary wakeword may be a name, such as the name, "Alexa," however persons of ordinary skill in the art will recognize that any word (e.g., "Amazon"), or series of words (e.g., "Wake Up" or "Hello, Alexa") may alternatively be used. Furthermore, the wakeword may be set or programmed by an individual operating a voice activated electronic device, and in some embodiments more than one wakeword (e.g., two or more different wakewords) may be available to activate a voice activated electronic device. In yet another embodiment, the trigger that is used to activate a voice activated electronic device may be any series of temporally related sounds.

In some embodiments, an individual may speak an utterance to enable and/or disable one or more functionalities for their user account on a backend system, where the user account is associated with the individual's requesting electronic device. As an illustrative example, an individual may say an utterance to their voice activated electronic device that is prefaced by a wakeword. In this instance, the utterance may include a wakeword followed by a request to enable or disable a particular application that may be used with their voice activated electronic device. For example, an individual may say "Alexa—Enable 'Animal Facts' Application," or "Alexa—Enable 'Movie Trivia' Application," or "Alexa—Disable 'Daily Squirrel Jokes' Application." Thus, in response to detecting the utterance of the wakeword, "Alexa," the voice activated electronic device may send audio data representing the utterance (e.g., "Alexa—Enable 'Movie Trivia' Application") to the backend system.

A voice activated electronic device may monitor audio input data detected within its local environment using one or more microphones, transducers, or any other audio input device located on, or in communication with, the voice activated electronic device. The voice activated electronic device may, in some embodiments, then provide the audio data representing the detected audio input data to the backend system for processing or analyzing the audio data, and providing a response to the audio data for the voice activated electronic device, as well as, or alternatively, providing an additional action directed at another device (e.g., a target device). Additionally, the voice activated electronic device may store one or more wakewords within its local memory. If a determination is made that audio data received from the audio input device(s) (e.g., microphone(s)) matches the wakeword, the voice activated electronic device may begin sending all of the audio data to a backend system.

A sound controlled electronic device may also correspond to a sound activated electronic device that may be triggered by a non-verbal sound. For example, the sound of a door opening, an alarm going off, glass breaking, a telephone ringing, or any other sound may be used to activate a sound activated electronic device. In this particular scenario, detection of a non-verbal sound may occur in a substantially similar manner as that of a verbal wakeword for a voice activated electronic device. For example, the sound of a door opening, when detected, may activate the sound activated electronic device, which may in turn cause the backend system to activate a burglar alarm.

In some embodiments, the requesting electronic device with which the utterance is spoken may, alternatively, correspond to a manually activated electronic device. A manually activated electronic device, as described herein, may correspond to a device to that is capable of being activated in response to a manual input from an individual (e.g., pressing a button, touching a portion of touch screen, performing an action on a device, etc.). For example, a tap-to-talk electronic device is on type of manually activated electronic device. Such tap-to-talk electronic devices, for instance, are capable of obtaining and outputting audio data in response to a button being pressed by an individual.

In some embodiments, an individual may activate their manually activated electronic device (e.g., by pressing a button), and may utter a command for a media item to be played on a particular target electronic device. For example, an individual may press a button on their manually activated electronic device, and may say, "Enable 'Animal Facts' Application." The manually activated electronic device may then send audio data representing the spoken command to a backend system, which in turn may cause a corresponding application to enable for the individual's user account. In some embodiments, the backend system may provide the manually activated electronic device with an audio message that indicates that an application, which was requested to be enabled or disabled, has been enabled or disabled. In some embodiments, the backend system may be further configured to provide the manually activated electronic device with a confirmation message so that the individual can confirm whether or not the correct application is going to be enabled/disabled, as well as if that application should, in fact, be enabled/disabled. For example, the backend system may generate and send audio data representing a message, "To enable 'Animal Facts,' press the activation button and say: 'Enable 'Animal Facts'," to the manually activated electronic device. The individual may, in response, then press the activation button for the manually activated electronic device, and speak the utterance "Enable 'Animal Facts'." Alternatively, the backend system may further generate an instruction that causes the manually activated electronic device to continue capturing local audio for a predefined temporal duration in order to determine whether an answer to the audio message is uttered. The manually activated electronic device may then be configured to send audio data back to the backend system representing the utterance, and may enable/disable that application based on the utterance.

Figure 1B:
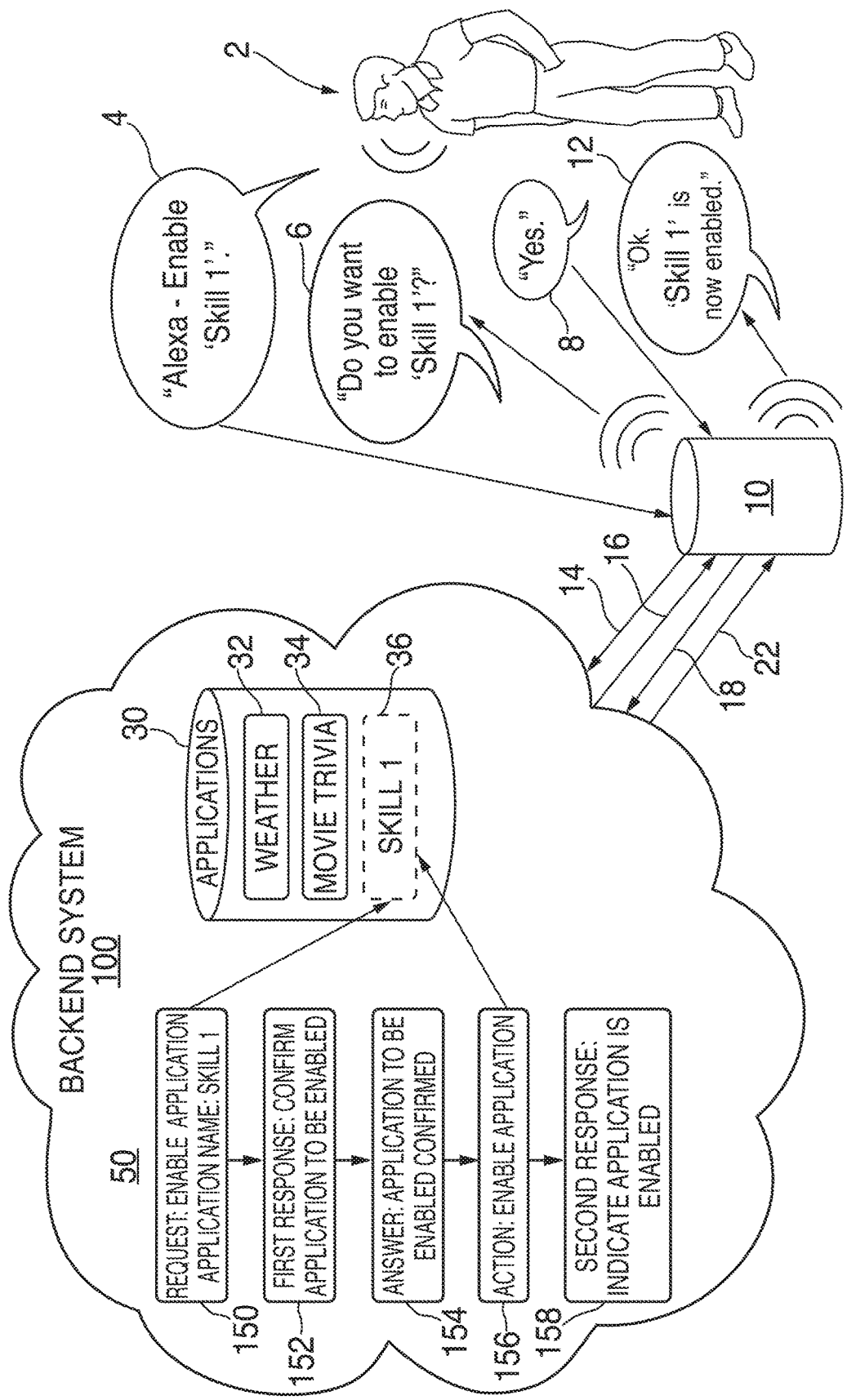

FIGS. 1A and 1B are illustrative diagrams of systems for enabling an application using speech, in accordance with various embodiments. In a non-limiting exemplary embodiment of FIG. 1A, an individual 2 may speak an utterance 4, which may include a wakeword. For example, utterance 4 may be, "Alexa—Enable 'Skill 1'." Utterance 4 may be spoken in the vicinity of an electronic device 10, such that one or more microphones of electronic device 10 are capable of receiving audio data representing utterance 4. In some embodiments, electronic device 10 may be a voice activated electronic device capable of detecting that a wakeword (e.g., "Alexa") was spoken within utterance 4. In this particular scenario, electronic device 10 may begin sending audio data representing utterance 4 to a backend system 100 in response to detection of the wakeword. In some embodiments, however, electronic device 10 may be a manually activated electronic device, capable of detecting a manual input and recording sounds detected after the manual input. In this particular scenario, electronic device 10 may send audio data representing utterance 4 to backend system 100 after the manual input has occurred.

In some embodiments, electronic device 10 may continuously record local audio to determine whether the wakeword was uttered. If so, electronic device 10 may send audio data representing the recorded local audio to backend system 100. For instance, audio data 14 representing some of utterance 4 (e.g., "Enable 'Skill 1'"), all of utterance 4 (e.g., "Alexa—Enable 'Skill 1'"), or all of utterance 4 plus additional audio signals received just prior to the wakeword being uttered (e.g., 0.5-1.0 millisecond) may be sent to backend system 100. In some embodiments, one or more pieces of additional data, such as a time and/or date that utterance 4 was spoken, a time/date that audio data representing utterance 4 was received by one or more microphones of electronic device 10, a location of electronic device 10, an IP address associated with electronic device 10, a device type of electronic device 10 (e.g., tablet, smartphone, laptop, smart appliance, etc.), an identifier (e.g., a number, string, phrase, etc.) associated with electronic device 10, or any other information, or any combination thereof, may also be provided to backend system 100 along with audio data 14.

An individual 2 may speak utterance 4, which may be directed to their electronic device 10, in order to use certain functionalities of backend system 100, receive content and/or information from backend system 100, and/or perform one or more actions via backend system 100. Electronic device 10, as one illustrative example, may be a voice activated electronic device that allows individual 2 to interface with backend system 100 using speech. Various actions that individual 2 may desire to obtain, or to have occur, may be controlled by backend system 100, and electronic device 10 may function as a gateway for applications available by backend system 100 that are capable of performing some or all of the various actions. These application, which may have certain capabilities, may cause specific content to be provided to electronic device 10 (and therefore to individual 2), or have actions be performed. However, functionalities associated with some application may, prior to being used, need to be enabled so that those functionalities are available for use by individual 2. Additionally, functionalities associated with some applications may need to be disabled such that those functionalities are no longer available for use by individual 2. Therefore, certain utterances spoken by individual 2, or any other individual, may correspond to requests to enable or disable one or more application.

As mentioned previously, individual 2 may speak utterance 4 to electronic device 10. Electronic device 10 may send audio data 14 representing utterance 4 to backend system 100 over a network, such as the Internet, using any number of communications protocols. For example, Transfer Control Protocol and Internet Protocol ("TCP/IP") (e.g., any of the protocols used in each of the TCP/IP layers), Hypertext Transfer Protocol ("HTTP"), and wireless application protocol ("WAP"), are some of the various types of protocols that may be used to facilitate communications between electronic device 10 and backend system 100. In some embodiments, electronic device 10 and backend system 100 may communicate with one another via a web-browser using HTTP. Various additional communication protocols may be used to facilitate communications between electronic device 10 and backend system 100 including, but not limited to, Wi-Fi (e.g., 802.11 protocol), Bluetooth®, Wi-Fi Direct, radio frequency systems (e.g., 900 MHz, 1.4 GHz, and 5.6 GHz communication systems), cellular networks (e.g., GSM, AMPS, GPRS, CDMA, EV-DO, EDGE, 3GSM, DECT, IS-136/TDMA, iDen, LTE or any other suitable cellular network protocol), infrared, BitTorrent, FTP, RTP, RTSP, SSH, and/or VOIP.

Backend system 100 may, for example, include one or more processors, databases, and/or servers, each in communication with one another and/or electronic device 10. Each processor, database, and/or server of backend system 100 may be capable of storing, retrieving, processing, analyzing, and/or generating data to be provided to electronic devices 10, and/or to one or more additional devices. For example, backend system 100 may include one or more game servers for storing and processing information related to one or more different games (e.g., "Simon Says," karaoke, etc.). As another example, backend system 100 may include one or more weather servers for storing weather information and/or providing weather information to electronic device 10. Backend system 100 may, in some embodiments, correspond to a collection of servers located within a remote facility, and individuals may store data on backend system 100 and/or communicate with backend system 100 using one or more of the aforementioned communications protocols. In one embodiment, an application's one or more processors, databases, and/or servers may need to be enabled or disabled for an individual's user account on backend system 100 so that an individual may access the application's functionalities.

Upon receiving audio data 14, backend system 100 may generate first text data representing utterance 4, and may determine an intent of utterance 4 using the generated first text data. For example, backend system 100 may determine that individual 2 wants an application, "Skill 1," to be enabled. Backend system 100, in an example embodiment of FIG. 1A, may execute an exemplary process 50. For instance, at step 52, an enablement intent may be determined, as well as a directive of the enablement intent. In the illustrative example, the enablement intent may be, "Enable," while the directive may be, "Skill 1."

In some embodiments, backend system 100 may, upon receiving audio data 14, determine a user account associated with electronic device 10. For example, in addition to, or along with, audio data 14, an identifier associated with electronic device 10 may also be received by backend system 100. Backend system 100 may determine that electronic device 10 is associated with a particular user account for individual 2 based on the received identifier. As an illustrative example, audio data 14 may also include an alphanumeric string (e.g., ABCD1234) that is unique to electronic device 10. Backend system 100 may determine that a user account on backend system 100 may correspond to the alphanumeric string, and therefore may determine that a language model associated with the user account may be used to perform speech processing to audio data 14, and may access one or more applications' functionalities for responding to the intent. As described in greater detail below, the user account may include one or more user profiles, content available to a device associated with the user account (e.g., electronic device 10), additional devices associated with that user account, and/or applications enabled for the user account.

In some embodiments, backend system 100 may determine which applications are currently enabled for the user account associated with electronic device 10 in response to determining that an intent of an utterance is for a particular application to be enabled. If backend system 100 determines the user account does not have the desired application enabled (e.g., "Skill 1"), then backend system 100 may cause that application to be enabled. However persons of ordinary skill in the art will recognize that this is exemplary, and backend system 100 may not first determine which applications are enabled for a particular user account, and may instead attempt to enable the desired application regardless of a current enablement status (e.g., enabled, disabled).

To enable the application, backend system 100 may, for example, search through an applications database 30. Applications database 30 may, in some embodiments, include a listing of all of the applications that are available to be used by a user account of backend system 100, as well as a listing of all of the application names associated with those applications. Furthermore, applications database 30 may include a listing of common words, phrases, and/or invocations associated with each of the applications. For example, applications database 30 may include a first listing of applications, such as a first application 32, a second application 34, and a third application 36. Applications database 30 may also include a second listing of application names. For example, the second listing may indicate that first application 32 has a first application name of "Weather" (e.g., a weather application), second application 34 has a second application name of "Movie Trivia" (e.g., an application including trivia for various movies), and third application 36 has a third application name "Skill 1."

Using the generated text and the determined intent, backend system 100 may determine, in an illustrative embodiment, that utterance 4 corresponded to a request to enable an application having a name "Skill 1." Backend system 100 may then determine that applications database 30 includes an application having an application name that substantially matches the name of the requested application. In some embodiments, backend system 100 may determine a similarity value between the name of the requested application (e.g., {Application Name}: Skill 1), and one or more application names of the second listing of application names. The similarity values may then be ranked in order of most similar to least similar, thereby indicating the most likely applications that the name is associated with. Backend system 100 may, for instance, determine the N application names that yielded the greatest similarity values, and may determine the N applications corresponding those N application names. Persons of ordinary skill in the art will recognize that N may be any integer value (e.g., N=1, 2, 3, . . . etc.).

In some embodiments, the similarity values may be ranked, and applications associated with application names having a similarity value in excess of the similarity threshold value may be selected as the most likely application that utterance 4 relates to. As an illustrative example, similarity values may be determined that compare the name "Skill 1" from utterance 4 with a first application name— "Weather"—of first application 32, a second application name—"Movie Trivia"—of second application 34, and a third application name—"Skill 1"—of third application 36. In this particular scenario, a similarity value of the third application name and the name of the application from utterance 4 may be greater than a similarity threshold value, indicating that the third application 36 likely is the targeted application for the invocation "Enable 'Skill 1'" of utterance 4. In some embodiments, the application associated with the top ranked similarity value may be determined to be the intended application to be enabled for the user account.

At step 54, the application may be enabled for the user account on backend system 100 associated with electronic device 10. This may correspond to updating a language model for the user account such that one or more invocation phrases for invoking the application being added to the language model. Furthermore, the language model for the user account may be updated to also include one or more sample utterance templates, including one or more slots, fields, or placeholders, such that the updated language model may be capable of determining whether an additional utterance has a same format of one of the sample utterance templates for that application. Additionally, the language model may be updated to include one or more sample response templates, including one or more response slots, fields, or placeholders, such that the updated language model may be capable of selecting one of the sample response templates to use for responding to a subsequent utterance associated with that application. Still further, the language model may be updated to include one or more slot, field, or placeholder values for the application, to be used with one of the application response slots, fields, or placeholders.

In a non-limiting exemplary embodiment of FIG. 1B, an individual may enable an application's functionality for their user account by speaking utterance 4, and backend system 100 may also be able to have additional communication with electronic device 10. At step 152, an enablement intent may be determined, as well as a directive of the enablement intent. Step 152, in one embodiment, may be substantially similar to step 52 of FIG. 1A, and the previous description may apply. In some embodiments, a first response may be sent to electronic device 10 that asks for confirmation that the determined application should be enabled. In response to determining that utterance 4 includes an enablement intent (e.g., "Enable {Application Name}"), a confirmation response message may be determined to confirm that: the correct application was selected, and that the application should in fact be enabled. As an illustrative example, the confirmation response message may be, "Do you want to enable {Application Name}." For instance, if the desired application was determined to be "Skill 1," then a confirmation response may be, "Do you want to enable 'Skill 1'" In some embodiments, text data representing the confirmation response message may be received from a prompts module that includes a listing of response messages that may be used for enabling/disabling applications. Audio data 16 representing the text data may then be generated using text-to-speech functionality of backend system 100, and audio data 16 may be sent to electronic device 10 such that an audio message 6 corresponding to the confirmation response message, "Do you want to enable 'Skill 1'?" plays on electronic device 10.

In addition to sending audio data 16 to electronic device 10, backend system 100 may also generate an instruction that causes electronic device 10 to continue sending audio captured after audio message 6 is played. In some embodiments, the instruction may cause a communications channel existing between electronic device 10 and backend system 100 to remain open, such that any audio data received by one or more microphones of electronic device 10, which may be uttered by individual 2 in response to audio message 6, may be sent to backend system 100. As an illustrative example, electronic device 10 may continually record audio received by its one or more microphones to determine whether the wakeword was uttered. In response to detecting the wakeword within an utterance, electronic device 10 may send audio data representing the utterance, such as utterance 4, to backend system 100. Afterword, electronic device 10 may still be recording local audio, however that audio may not be sent to backend system 100 unless, in one embodiment, that audio includes another utterance of the wakeword. Therefore, the instruction that is provided to electronic device 10 with audio data 16 may cause electronic device 10 to send additional audio data representing additional audio to backend system 100, and in particular, the additional audio that is detected after audio message 6 is output by electronic device 10.

In some embodiments, individual 2 may speak an additional utterance 8 to respond to audio message 6. For instance, audio message 6 may ask for individual 2 to confirm that an application entitled, "Skill 1," should be enabled for their user account on backend system 100. In response to audio message 6, individual 2 may say utterance 8—"Yes"—and audio data 18 representing utterance 8 may be sent to backend system 100. Text data representing audio data 18 may be generated by the automatic speech recognition functionality of backend system 100, and an intent of utterance 8 may be determined using the natural language understanding functionality of backend system 100. For instance, process 150 may proceed to step 156, where the intent of utterance 8 may be determined to be a confirmation that the previously determined application (e.g., "Skill 1") should be enabled for the user account of individual 2. Thus, at step 158, an action item may be determined, which may be for the determined application to be enabled. For instance, because individual 2 confirmed that the application "Skill 1" should be enabled, backend system 100 may cause third application 36 corresponding to the "Skill 1" application, to be enabled for the user account associated with individual 2. Furthermore, at step 158, the application's functionalities may be enabled for the user account such that the language model associated with the user account is updated. For example, step 158 may be substantially similar to step 54 of FIG. 1A, and the previous description may apply.

At step 160, a second response may be determined from the third listing of response messages that indicates that the requested application is now enabled for the user account. For example, text data representing a response stating, "Ok. {Skill Name} is now enabled" may be received at the text-to-speech module from the prompts module. Continuing the aforementioned examples, {Skill Name} may correspond to "Skill 1," and therefore the text-to-speech module may generate audio data 22 representing text data of the response, "Ok. 'Skill 1' is now enabled." Backend system 100 may send audio data 22 to electronic device 10, such that an audio message 12 of the response "Ok. 'Skill 1' is now enabled." is played by electronic device 10.

Figure 2A:
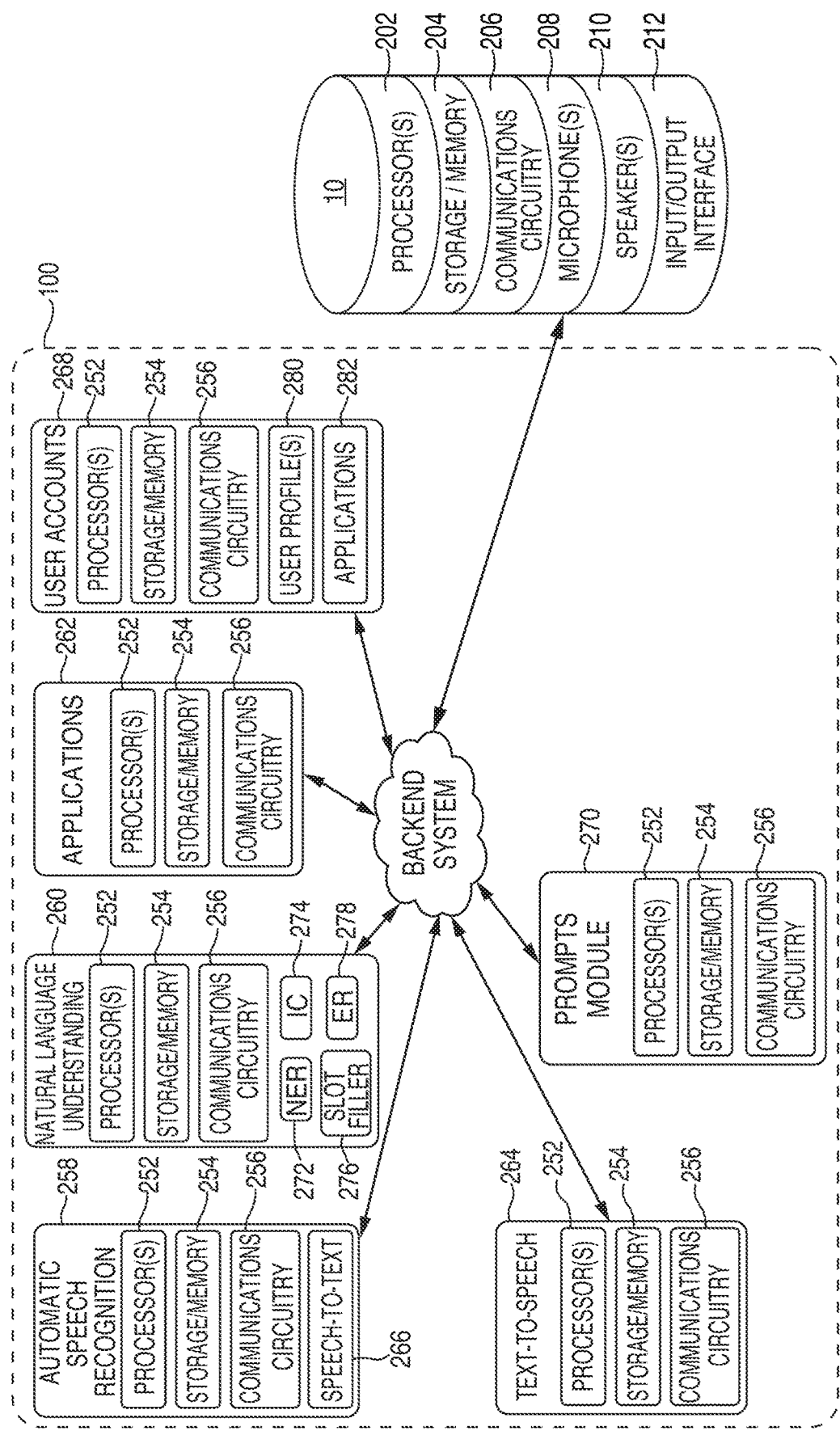
FIG. 2A is an illustrative diagram of a portion of the system architecture of FIG. 1, in accordance with various embodiments.

FIG. 2A is an illustrative diagram of a portion of the system architecture of FIG. 1, in accordance with various embodiments. Electronic device 10, in some embodiments, may correspond to any type of electronic device capable of being activated in response to detecting a specific sound, such as a voice activated electronic device. After detecting a specific sound (e.g., a wakeword or trigger), electronic device 10 may, in some embodiments, recognize commands (e.g., audible commands, inputs) within captured audio, and may perform one or more actions in response to the received commands. Electronic device 10 may correspond to any suitable type of electronic device including, but are not limited to, desktop computers, mobile computers (e.g., laptops, ultrabooks), mobile phones, smart phones, tablets, televisions, set top boxes, smart televisions, watches, bracelets, display screens, personal digital assistants ("PDAs"), smart furniture, smart household devices, smart vehicles, smart transportation devices, and/or smart accessories. In some embodiments, electronic device 10 may be relatively simple or basic in structure such that no mechanical input option(s) (e.g., keyboard, mouse, track pad) or touch input(s) (e.g., touchscreen, buttons) may be provided. For example, electronic device 10 may be a voice activated electronic device, and may be able to receive and output audio, and may include power, processing capabilities, storage/memory capabilities, and communication capabilities. However, in some embodiments, electronic device 10 may include one or more mechanical input options and or touch input components.

Electronic device 10 may, in an illustrative non-limiting embodiment, include a minimal number of input mechanisms, such as a power on/off switch. However primary functionality, in one embodiment, of electronic device 10 may solely be through audio input and audio output. For example, electronic device 10 may listen for a wakeword by continually monitoring local audio. In response to the wakeword being detected, electronic device 10 may establish a connection with backend system 100, send audio data to backend system 100, and await/receive a response from backend system 100.

In some embodiments, however, electronic device 10 may correspond to a manually activated electronic device. In response to detecting a manually input, electronic device 10 may also communicate with backend system 100 (e.g., push-to-talk devices). For example, in response to pressing and holding a button, tapping a button or touch screen, or providing any other suitable manual input, electronic device 10 may be configured to record audio. Furthermore, electronic device 10 may also be configured to establish a connection with backend system 100, send audio data representing the recorded audio to backend system 100, and await/receive a response from backend system 100.

Electronic device 10 may include one or more processors 202, storage/memory 204, communications circuitry 206, one or more microphones 208 or other audio input devices (e.g., transducers), one or more speakers 210 or other audio output devices, as well as an optional input/output ("I/O") interface 212. However, one or more additional components may be included within electronic device 10, and/or one or more components may be omitted. For example, electronic device 10 may include a power supply or a bus connector. As another example, electronic device 10 may not include an I/O interface (e.g., I/O interface 212). Furthermore, while multiple instances of one or more components may be included within electronic device 10, for simplicity only one of each component has been shown.

Processor(s) 202 may include any suitable processing circuitry capable of controlling operations and functionality of electronic device 10, as well as facilitating communications between various components within electronic device 10. In some embodiments, processor(s) 202 may include a central processing unit ("CPU"), a graphic processing unit ("GPU"), one or more microprocessors, a digital signal processor, or any other type of processor, or any combination thereof. In some embodiments, the functionality of processor(s) 202 may be performed by one or more hardware logic components including, but not limited to, field-programmable gate arrays ("FPGA"), application specific integrated circuits ("ASICs"), application-specific standard products ("AS SPs"), system-on-chip systems ("SOCs"), and/or complex programmable logic devices ("CPLDs"). Furthermore, each of processor(s) 202 may include its own local memory, which may store program modules, program data, and/or one or more operating systems. However, processor(s) 202 may run an operating system ("OS") for electronic device 10, and/or one or more firmware applications, media applications, and/or applications resident thereon.

Storage/memory 204 may include one or more types of storage mediums such as any volatile or non-volatile memory, or any removable or non-removable memory implemented in any suitable manner to store data on electronic device 10. For example, information may be stored using computer-readable instructions, data structures, and/or program modules. Various types of storage/memory may include, but are not limited to, hard drives, solid state drives, flash memory, permanent memory (e.g., ROM), electronically erasable programmable read-only memory ("EEPROM"), CD-ROM, digital versatile disk ("DVD") or other optical storage medium, magnetic cassettes, magnetic tape, magnetic disk storage or other magnetic storage devices, RAID storage systems, or any other storage type, or any combination thereof. Furthermore, storage/memory 204 may be implemented as computer-readable storage media ("CRSM"), which may be any available physical media accessible by processor(s) 202 to execute one or more instructions stored within storage/memory 204. In some embodiments, one or more applications (e.g., gaming, music, video, calendars, lists, etc.) may be run by processor(s) 202, and may be stored in memory 204.

In some embodiments, storage/memory 204 may include one or more modules and/or databases, such as a speech recognition module, a wakeword database, a sound profile database, and a wakeword detection module. The speech recognition module may, for example, include an automatic speech recognition ("ASR") component that recognizes human speech in detected audio. The speech recognition module may also include a natural language understanding ("NLU") component that determines user intent based on the detected audio. Also included within the speech recognition module may be a text-to-speech ("TTS") component capable of converting text to speech to be outputted by speaker(s) 210, and/or a speech-to-text ("STT") component capable of converting received audio signals into text to be sent to backend system 100 for processing.

The wakeword database may be a database stored locally on electronic device 10 that includes a list of a current wakeword for electronic device 10, as well as one or more previously used, or alternative, wakewords for electronic device 10. In some embodiments, an individual may set or program a wakeword for electronic device 10. The wakeword may be programmed directly on electronic device 10, or a wakeword or words may be set by the individual via a backend system application that is in communication with backend system 100. For example, an individual may use their mobile device having the backend system application running thereon to set the wakeword. The specific wakeword may then be communicated from the mobile device to backend system 100, which in turn may send/notify their voice activated electronic device (e.g., electronic device 10) of the individual's selection for the wakeword. The selected activation may then be stored in the wakeword database of storage/memory 204. In some embodiments, additional trigger expressions or permutations of the wakeword may also be stored within storage/memory 204. For example, specific trigger expressions or words that indicate the presence of the wakeword may also be stored within storage/memory 204. In some embodiments, audio watermarks, indicating a specific action or message, may also be stored within storage/memory 204.

In some embodiments, sound profiles for different words, phrases, commands, or audio compositions are also capable of being stored within storage/memory 204, such as within a sound profile database. For example, a sound profile of a video or of audio may be stored within the sound profile database of storage/memory 204 on electronic device 10. In this way, if a particular sound (e.g., a wakeword or phrase) is detected by electronic device 10, a corresponding command or request may be ignored, for example. A sound profile, for example, may correspond to a frequency and temporal decomposition of a particular audio file or audio portion of any media file, such as an audio fingerprint or spectral representation.

The wakeword detection module may include an expression detector that analyzes an audio signal produced by microphone(s) 208 to detect a wakeword, which generally may be a predefined word, phrase, or any other sound, or any series of temporally related sounds. Such an expression detector may be implemented using keyword spotting technology, as an example. A keyword spotter is a functional component or algorithm that evaluates an audio signal to detect the presence of a predefined word or expression within the audio signal detected by microphone(s) 208. Rather than producing a transcription of words of the speech, a keyword spotter generates a true/false output (e.g., a logical I/O) to indicate whether or not the predefined word or expression was represented in the audio signal. In some embodiments, an expression detector may be configured to analyze the audio signal to produce a score indicating a likelihood that the wakeword is represented within the audio signal detected by microphone(s) 208. The expression detector may then compare that score to a wakeword threshold to determine whether the wakeword will be declared as having been spoken.

The wakeword detection module may compare audio data to stored models or data to detect the presence of a wakeword within an utterance. For instance, the wakeword detection module may apply general large vocabulary continues speech recognition ("LVCSR") systems to decode audio signals, with wakeword searching conducted in resulting lattices or confusion networks. LVCSR decoding may require relatively large computational resources, however.

In some embodiments, the wakeword detection module may employ a keyword spotter, which may use simplified ASR techniques. For example, an expression detector may use a Hidden Markov Model ("HMM") recognizer that performs acoustic modeling of the audio signal and compares the HMM model of the audio signal to one or more reference HMM models that have been created by training for specific trigger expressions. An HMM model represents a word as a series of states. Generally, a portion of an audio signal is analyzed by comparing its HMM model to an HMM model of the trigger expression, yielding a feature score that represents the similarity of the audio signal model to the trigger expression model.

In practice, an HMM recognizer may produce multiple feature scores, corresponding to different features of the HMM models. An expression detector may use a support vector machine ("SVM") classifier that receives the one or more feature scores produced by the HMM recognizer. The SVM classifier produces a confidence score indicating the likelihood that an audio signal contains the trigger expression. The confidence score is compared to a confidence threshold to make a final decision regarding whether a particular portion of the audio signal represents an utterance of the trigger expression (e.g., wakeword). Upon declaring that the audio signal represents an utterance of the trigger expression, electronic device 10 may then begin transmitting the audio signal to backend system 100 for detecting and responds to subsequent utterances made by an individual.

There may be one or more HMMs built to model the non-wakeword speech characteristics, which are named filler models. Viterbi decoding may be used to search for the best path in the decoding graph, and the decoding output may be further processed to make the decision on keyword presence. This approach can be extended to include discriminative information by incorporating hybrid deep neural network ("DNN")-HMM decoding framework. In another embodiment the wakeword spotting system may be built on DNN/recursive neural network ("RNN") structures directly, without MINI involved. Such a system may estimate the posteriors of wakewords with context information, either by stacking frames within a context window for DNN, or using RNN. Following-on posterior threshold tuning or smoothing is applied for making decisions. Persons of ordinary skill in the art will recognize that other wakeword detection techniques may also be employed, and the aforementioned are merely exemplary.

Communications circuitry 206 may include any circuitry allowing or enabling electronic device 10 to communicate with one or more devices, servers, and/or systems. For example, communications circuitry 206 may facilitate communications between electronic device 10 and backend system 100, and/or between electronic device 10 and one or more additional electronic devices (e.g., a television, speaker(s), etc.). Communications circuitry 206 may use any communications protocol, such as any of the previously mentioned exemplary communications protocols. In some embodiments, electronic device 10 may include an antenna to facilitate wireless communications with a network using various wireless technologies (e.g., Wi-Fi, Wi-Fi Direct, Bluetooth®, radiofrequency, etc.). In yet another embodiment, electronic device 10 may include one or more universal serial bus ("USB") ports, one or more Ethernet or broadband ports, and/or any other type of hardwire access port so that communications circuitry 206 allows electronic device 10 to communicate with one or more communications networks.

Electronic device 10 may also include one or more microphones 208 and/or transducers. Microphone(s) 208 may be any suitable component capable of detecting audio signals. For example, microphone(s) 208 may include one or more sensors for generating electrical signals and circuitry capable of processing the generated electrical signals. In some embodiments, microphone(s) 208 may include multiple microphones capable of detecting various frequency levels. As an illustrative example, electronic device 10 may include multiple microphones (e.g., four, seven, ten, etc.) placed at various positions about electronic device 10 to monitor/capture any audio outputted in the environment where electronic device 10 is located. The various microphones 208 may include some microphones optimized for distant sounds (e.g., far-field microphones), while some microphones may be optimized for sounds occurring within a close range of electronic device 10.

Electronic device 10 may further include one or more speakers 210. Speaker(s) 210 may correspond to any suitable mechanism for outputting audio signals. For example, speaker(s) 210 may include one or more speaker units, transducers, arrays of speakers, and/or arrays of transducers that may be capable of broadcasting audio signals and or audio content to a surrounding area where electronic device 10 may be located. In some embodiments, speaker(s) 210 may include headphones or ear buds, which may be wirelessly wired, or hard-wired, to electronic device 10, that may be capable of broadcasting audio directly to an individual.

In some embodiments, one or more microphones 208 may serve as input devices to receive audio inputs, such as audio message 8 from television 20. Electronic device 10, in the previously mentioned embodiment, may then also include one or more speakers 210 to output audible responses or follow-up statements. In this manner, electronic device 10 may function solely through speech or audio, without the use or need for any input mechanisms or displays.

In one exemplary embodiment, electronic device 10 includes I/O interface 212. The input portion of I/O interface 212 may correspond to any suitable mechanism for receiving inputs from an individual operating electronic device 10. For example, a camera, keyboard, mouse, joystick, or external controller may be used as an input mechanism for I/O interface 212. The output portion of I/O interface 212 may correspond to any suitable mechanism for generating outputs from electronic device 10. For example, one or more displays may be used as an output mechanism for I/O interface 212. As another example, one or more lights, light emitting diodes ("LEDs"), or other visual indicator(s) may be used to output signals via I/O interface 212 of electronic device 10. In some embodiments, one or more vibrating mechanisms and/or other haptic features may be included with I/O interface 212 to provide a haptic response to an individual from electronic device 10. Persons of ordinary skill in the art will recognize that, in some embodiments, one or more features of I/O interface 212 may be included in a purely voice activated version of electronic device 10. For example, one or more LED lights may be included on a voice activated electronic device such that, when microphone(s) 208 receive audio, the one or more LED lights become illuminated signifying that audio has been received by the voice activated electronic device. In some embodiments, I/O interface 212 may include a display screen and/or touch screen, which may be any size and/or shape and may be located at any portion of electronic device 10. Various types of displays may include, but are not limited to, liquid crystal displays ("LCD"), monochrome displays, color graphics adapter ("CGA") displays, enhanced graphics adapter ("EGA") displays, variable graphics array ("VGA") display, or any other type of display, or any combination thereof. Still further, a touch screen may, in some embodiments, correspond to a display screen including capacitive sensing panels capable of recognizing touch inputs thereon.

Backend system 100 may include various components and modules including, but not limited to, automatic speech recognition ("ASR") module 258, natural language understanding ("NLU") module 260, applications module 262, text-to-speech ("TTS") module 264, user accounts module 268, and prompts module 270. In some embodiments, backend system 100 may also include computer readable media, including, but not limited to, flash memory, random access memory ("RAM"), and/or read-only memory ("ROM"). Backend system 100 may also include various modules that store software, hardware, logic, instructions, and/or commands for backend system 100, such as a speaker identification ("ID") module, or any other module, or any combination thereof.

ASR module 258 may be configured to recognize human speech in detected audio, such as audio captured by electronic device 10, which may then be transmitted to backend system 100. ASR module 258 may include, in one embodiment, one or more processor(s) 252, storage/memory 254, and communications circuitry 256. Processor(s) 252, storage/memory 254, and communications circuitry 256 may, in some embodiments, be substantially similar to processor(s) 202, storage/memory 204, and communications circuitry 206, which are described in greater detail above, and the aforementioned descriptions may apply. Furthermore, in some embodiments, ASR module 258 may include speech-to-text ("STT") module 266. STT module 266 may employ various speech-to-text techniques. However, techniques for transcribing speech into text are well known in the art and need not be described in further detail herein, and any suitable computer implemented speech to text technique may be used to convert the received audio signal(s) into text, such as SOFTSOUND speech processing technologies available from the Autonomy Corporation, which is headquartered in Cambridge, England, United Kingdom.

ASR module 258 may include an expression detector that analyzes audio signals received by backend system 100, such as the expression detector mentioned above with regards to electronic device 10. Such an expression detector may be implemented using keyword spotting technology, as an example. A keyword spotter is a functional component or algorithm that evaluates an audio signal to detect the presence of a predefined word or expression, such as a passphrase or other sound data, within the audio signals. Rather than producing a transcription of words of the speech, a keyword spotter generates a true/false output (e.g., a logical I/O) to indicate whether or not the predefined word or expression was represented in the audio signal. In some embodiments, an expression detector may be configured to analyze the audio signal to produce a score indicating a likelihood that a particular word or phrase (e.g., a wakeword), is represented within the audio signal. The expression detector may then compare that score to a threshold value to determine whether that word or phrase will be declared as having been spoken.

For instance, ASR module 258 may transcribe received audio data into text data representing the words of the speech contained in the audio data using STT module 266. The text data may then be used by other components for various purposes, such as executing system commands, inputting data, etc. ASR module 258 may then interpret an utterance based on the similarity between the utterance and pre-established language models stored in an ASR model knowledge base of storage/memory 254. For example, the input audio data may be compared with models for sounds (e.g., sub-word units or phonemes) and sequences of sounds to identify words that match the sequence of sounds spoken in the utterance of the audio data.

The different ways a spoken utterance may be interpreted (i.e., the different hypotheses) may each be assigned a probability or a confidence score representing a likelihood that a particular set of words matches those spoken in the utterance. The confidence score may be based on a number of factors including, for example, the similarity of the sound in the utterance to models for language sounds (e.g., an acoustic model), and the likelihood that a particular word which matches the sounds would be included in the sentence at the specific location (e.g., using a language or grammar model). Thus each potential textual interpretation of the spoken utterance (hypothesis) is associated with a confidence score. Based on the considered factors and the assigned confidence score, ASR module 258 may output the most likely text recognized in the audio data. ASR module 258 may also output multiple hypotheses in the form of a lattice or an N-best list with each hypothesis corresponding to a confidence score or other score (such as probability scores, etc.).

ASR module 258 may further attempt to match received feature vectors to language phonemes and words as known in acoustic models and language models stored within storage/memory 254 of ASR module 258. Recognition scores may be determined for the feature vectors based on acoustic information and language information. The acoustic information may be used to calculate an acoustic score representing a likelihood that the intended sound represented by a group of feature vectors matches a language phoneme. The language information may be used to adjust the acoustic score by considering what sounds and/or words are used in context with each other, thereby improving the likelihood that the speech recognition process will output speech results that make sense grammatically. The specific models used may be general models or may be models corresponding to a particular domain, such as music, application enablement/disablement, shopping, etc.

ASR module 258 may generate results in the form of a single textual representation of the speech, an N-best list including multiple hypotheses and respective scores, and/or lattice, for example, which may be sent to NLU module 260 for processing, such as conversion of the text into commands for execution, either by electronic device 10, backend system 100, or by another device, such as a separate device or server capable of performing one or more additional functionalities thereon (e.g., a television capable of outputting video content).

NLU module 260 may be configured such that it determines an intent of an utterance based on the received audio data. For example, NLU module 260 may determine that the intent of utterance 4 is for a particular application to be enabled. In response to determining an utterance's intent, NLU module 260 may communicate the received command to an application of applications module 262 to cause one or more specific functionalities to be accessible, perform one or more tasks, and/or retrieve an appropriate response or response information. NLU module 260 may include processor(s) 252, storage/memory 254, and communications circuitry 256 which, in one embodiment, may be substantially similar to processor(s) 202, storage/memory 204, and communications circuitry 206 of electronic device 200, and the previous description may apply.

NLU module 260 may include a named entity recognition ("NER") module 272, which may be used to identify portions of text that correspond to a named entity recognizable by NLU module 260. A downstream process called named entity resolution may be configured to link a portion of text to an actual specific known entity. To perform named entity resolution, the system may utilize gazetteer information stored in an entity library storage. The gazetteer information may be used for entity resolution, for example matching ASR results with different entities (such as song titles, contact names, etc.). Gazetteers may be linked to a user account or profile of users accounts module 268, certain domains (e.g., music or shopping), or may be organized in a variety of other ways.

Generally, NLU module 260 takes textual input and attempts to make a semantic interpretation of the text. That is, NLU module 260 may be configured to determine a meaning of text based on the individual words and then implements that meaning. In some embodiments, NLU module 260 may interpret a text string to derive an intent or a desired action of the utterance (e.g., utterance 4) as well as the pertinent pieces of information in the text that allow an action to be completed. For example, if a spoken utterance is processed by ASR module 258 and outputs the text, "call mom," NLU module 260 may determine that an intent of the utterance is to activate a telephone, or telephone functionality, and to initiate a call with a contact matching the entity "mom". In some embodiments, NLU module 260 may process several textual inputs related to the same utterance. For example, if ASR module 258 outputs N text segments (as part of an N-best list), then NLU module 260 may process all N outputs.

As will be discussed further below, NLU module 260 may be configured to parse and tag annotate text. For example, for the text "call mom," "call" may be tagged as a command (e.g., a command to execute a phone call), and "mom" may be tagged as a specific entity and target of the command (e.g., a telephone number for the entity corresponding to "mom" stored in a contact list). Further, NLU module 260 may be used to provide answer data in response to queries, for example using a knowledge base stored within storage/memory 254 of NLU module 260 and/or storage/memory of backend system 100.

To correctly perform natural language understanding processing of speech input, NLU module 260 may be configured to determine a "domain" of an utterance. By determining the domain, NLU module 260 may narrow down which services and functionalities offered by an endpoint device (e.g., electronic device 10, backend system 100, or any other electronic device or system) may be relevant. For example, an endpoint device may offer services relating to interactions with a telephone service, a contact list service, a calendar/scheduling service, a music player service, etc. As another example, an endpoint device may enable certain services or functionalities for an individual having a user account of backend system 100. Words in a single text query may implicate more than one service, and some services may be functionally linked (e.g., both a telephone service and a calendar service may utilize data from the contact list).

NER module 272 may be configured to receive a query in the form of one or more results from ASR module 258. NER module 272, which is described in greater detail within FIG. 2B, may then attempt to identify relevant grammars and lexical information that may be used to construe meaning of the one or more results. To do so, NER module 272 may begin by identifying potential domains that may relate to the received query. NLU module 260, may include a databases of devices within storage/memory 254 of NLU module 260 that may be used to identify domains associated with specific devices. For example, electronic device 10 may be associated with domains for music, telephone functionality, calendar information, contact lists, and/or device-specific communications. In addition, NLU module 260 may store an entity library including database entries for specific services available on a specific device or devices, either indexed by that device's identification number, a customer identification number, a household identification number, and/or using any other suitable indicator.

In one non-limiting embodiment, a domain may represent a discrete set of activities, services, and/or functionalities that have a common theme, such as "shopping", "music", or "applications". As such, each domain may be associated with a particular language model and/or grammar database, a particular set of intents/actions, and a particular personalized lexicon. In some embodiments, each user account may have its own language model including words, phrases, sentence structures, response templates, and the like, configured for the user account. Each gazetteer may include domain-indexed lexical information associated with a particular user account of user accounts module 268 and/or electronic device 10. For example, a first gazetteer may include first domain-index lexical information. A user's music-domain lexical information might include album titles, artist names, and song names, for example, whereas a user's contact-list lexical information might include the names of contacts. Since every user's music collection and contact list is presumably different, this personalized information improves entity resolution.

In some embodiments, NLU module 260 may be configured to apply the rules, models, and information applicable to each identified domain. For example, if a query potentially implicates both communications and music, the query may, substantially in parallel, the natural language understanding processing may use the grammar models and lexical information for communications, and may also use the grammar models and lexical information for music. The responses based on the query produced by each set of models is scored, with the overall highest ranked result from all applied domains is ordinarily selected to be the correct result, which is described in greater detail below with reference to FIG. 2B.

An intent classification ("IC") module 274 may parse the query to determine an intent or intents for each identified domain, where the intent corresponds to the action to be performed that is responsive to the query. Each domain is associated with a database of words linked to intents. For example, a music intent database may link words and phrases such as "quiet," "volume off," and "mute" to a "mute" intent. As another example, an application enablement database may link words and phrase such as "enable" or "disable" to an enablement or disablement intent, respectively. IC module 276 may be configured to identify potential intents for each domain by comparing words in the query to the words and phrases in that domain's intents database. Traditionally, the determination of an intent by IC module 274 is performed using a set of rules or templates that are processed against the incoming text to identify a matching intent.

In order to generate a particular interpreted response, the NER 272 applies the grammar models and lexical information associated with the respective domain to actually recognize one or more entities in the text of the query. Each grammar model includes the names of entities (i.e., nouns) commonly found in speech about the particular domain (i.e., generic terms), whereas the lexical information 286 from the gazetteer 284 is personalized to the user(s) and/or the device. For instance, a grammar model associated with the shopping domain may include a database of words commonly used when people discuss shopping.

The intents identified by IC module 274 may be linked to domain-specific grammar frameworks having "slots" or "fields" to be filled. Each slot or field may correspond to a portion of the query text that the system believes corresponds to an entity. For example, if "play music" is an identified intent, a grammar framework or frameworks may correspond to sentence structures such as "Play {Artist Name}," "Play {Album Name}," "Play {Song name}," "Play {Song name} by {Artist Name}," etc. However, to make resolution more flexible, these frameworks would ordinarily not be structured as sentences, but rather based on associating slots with grammatical tags. As another example, if "enable Skill 1" is an identified intent, a grammar framework may correspond to sentence structures such as "Enable {Application Name}," or "Enable {Invocation Name}."

For example, NER module 272 may parse the query to identify words as subject, object, verb, preposition, etc., based on grammar rules and/or models, prior to recognizing named entities. The identified verb may be used by IC module 274 to identify intent, which is then used by NER module 272 to identify frameworks. A framework for an intent of "play" may specify a list of slots/fields/placeholders applicable to play the identified "object" such as, for example, {Artist Name}, {Album Name}, {Song name}, {Application Name}, and any object modifier (e.g., a prepositional phrase). As another example, a framework for an intent of "enable" may specify a list of slots/fields/placeholders applicable to enable an application identified as the "object," such as {Application Name}, {Invocation Name}, and any object modifier. NER module 272 may then search the corresponding fields in the domain-specific and personalized lexicon(s), attempting to match words and phrases in the query tagged as a grammatical object or object modifier with those identified in the database(s).

This process may include semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields ("CRF"), and the like.

For instance, a query of "play Song 1 by Artist 1" might be parsed and tagged as {Verb}: "Play," {Object}: "Song 1," {Object Preposition}: "by," and {Object Modifier}: "Artist 1." At this point in the process, "Play" may be identified as a verb based on a word database associated with the music domain, which IC module 276 may determine corresponds to the "play music" intent. No determination has been made as to the meaning of "Song 1" and "Artist 1," but based on grammar rules and models, it may be determined that the text of these phrases relate to the grammatical object (i.e., entity) of the query. As another example, a request, "Enable "Skill 1" may be parsed and tagged as {Verb}: "Enable," {Object}: Skill 1."

The frameworks linked to the intent may then be used to determine what database fields should be searched to determine the meaning of these phrases, such as searching a user's gazette for similarity with the framework slots. So a framework for "play music intent" might indicate to attempt to resolve the identified object based {Artist Name}, {Album Name}, {Song name}, and {Application Name}, and another framework for the same intent might indicate to attempt to resolve the object modifier based on {Artist Name}, and resolve the object based on {Album Name} and {Song Name} linked to the identified {Artist Name}. If the search of the gazetteer does not resolve a slot/field using gazetteer information, NER module 272 may search the database of generic words associated with the particular domain. So for instance, if the query was "play songs by Artist 1," after failing to determine an album name or song name called "songs" by "Artist 1," NER module 272 may search the domain vocabulary for the word "songs." In the alternative, generic words may be checked before the gazetteer information, or both may be tried, potentially producing two different results.

The results of the natural language understanding processing may be tagged to attribute meaning to the query. So, for instance, "Play Song 1 by Artist 1" might produce a result of: {Domain} Music, {Intent} Play Music, {Artist Name} "Artist 1," {Media Type} SONG, and {Song Title} "Song 1." As another example, "Play songs by Artist 1" might produce: {Domain} Music, {Intent} Play Music, {Artist Name} "Artist 1," and {Media Type} SONG. Still further, "Enable 'Skill 1'" might produce a result of: {Domain} Application Enablement, {Enablement Intent} "Enable," and {Application Name} "Skill 1."

The output from NLU module 260 (which may include tagged text, commands, etc.) may then be sent to a command processor, which may be located on, or in communication with, backend system 100. The destination command processor may be determined based on the output of NLU module 260. For example, if NLU module 260 outputs include a command to play music, the destination command processor may be a music playing application, such as one located on electronic device 10 or in a music playing application, configured to execute a music playing command. If the output of NLU module 260, however, includes a search request, the destination command processor may include a search engine processor, such as one located on a search server, configured to execute a search command. If the output of NLU module 260 includes a request for enablement of an application's functionalities for a particular user account, then the language model for the user account may be updated to include one or more invocations, utterance frameworks, response frameworks, and values for the frameworks, for a particular application.

In some embodiments, NLU module 260 may also include an entity resolution module 278, which allows NLU module 260 to query each domain of NLU module 260 to determine which domain or domains believe that they can handle a given request. Upon performing the query, each domain of domain module 272 may return a "score" indicating a likelihood that they can handle the application in question. For instance, various domains may return scores of LOW, MEDIUM, or HIGH, indicating the likelihood that they can handle the particular application. Entity recognition module 278 may return application names or titles for the request, which may be based on relevance scores that estimate a confidence that a particular application may be best used for the request. As an illustrative example, if the utterance is, "Play My Music," NLU module 260 may determine, using entity resolution module 278, which domains, and thus applications, can likely handle this request, and may select the domain and/or application having the highest confidence score as the domain and/or application to handle the request. Furthermore, as described in greater detail below with reference to FIG. 2B, NLU module 260 may further include a slot filler module 276.

Applications module 262 may, for example, correspond to various action specific applications, which are capable of processing various task specific actions and/or performing various functionalities. Applications module 262 may further correspond to first party applications and/or third party applications capable of performing various tasks or actions, or performing various functionalities. For example, based on the context of the audio received from electronic device 10, backend system 100 may use a certain application to generate a response, or to obtain response information, which in turn may be communicated back to electronic device 10 and/or to another electronic device (e.g., a television). Applications module 262 may also include processor(s) 252, storage/memory 254, and communications circuitry 256.

In some embodiments, an application of applications module 262 may be written in various computer languages, such as JavaScript and Java. Various applications may include an intent schema file and a sample utterances file, such as, for example, IntentSchema.json including the JSON defining the intents of a particular application, and a SampleUtterances.txt including plain text sample utterances for the particular application. Applications may also include application specific code, such as a JavaScript or Java file, common library code, and various other JavaScript or Java modules.

As an illustrative example, one sample application that may be included by applications module 262 for backend system 100 may be a "History Buff" application, capable of looking up notable events for a particular day. An individual may ask for both an absolute date, such as "March third", "February second", etc.) or a relative date (e.g., "today", "yesterday", "next Tuesday", etc.). The "History Buff" application may playback three events for a particular day, and then may prompt the individual to see if he/she would like a next sets of events to be output.

TTS module 264 may employ various text-to-speech techniques. However, techniques for transcribing speech into text are well known in the art and need not be described in further detail herein, any suitable computer implemented speech to text technique may be used to convert the received audio signal(s) into text, such as SOFTSOUND speech processing technologies available from the Autonomy Corporation, which is headquartered in Cambridge, England, United Kingdom. TTS module 264 may also include processor(s) 252, storage/memory 254, and communications circuitry 256.

User accounts module 268 may store one or more user accounts or user profiles within user profiles module 282, corresponding to users having a registered account on backend system 100. For example, a parent may have a registered account on backend system 100, and each of the parent's children may have their own user profile registered under the parent's registered account. Information, settings, and/or preferences, for example, for each user profile may be stored within user profile module 280. In some embodiments, user accounts module 268 may store a voice signal, such as voice biometric information, for a specific user profile. This may allow speaker identification techniques to be used to match a voice to voice biometric data associated with a specific user profile. In some embodiments, user accounts module 268 may store a telephone number assigned to a particular user profile. In some embodiments, user accounts module 268 may include a list of media items currently stored within an individual's registered account or user profile. For example, a list of music or videos purchased or obtained by an individual may be stored within the individual's user profile on user accounts module 268, which may be accessed by the individual when the individual seeks to hear a particular song or songs, or view a particular video or videos. User accounts module 268 may also include applications module 282, which stores a listing of all applications currently enabled for each user profile stored within user profiles module 280. In some embodiments, NLU module 260 may receive indications of which applications are currently enabled for a particular user profile or account, such that NLU module 260 is aware of which rules and capabilities that backend system 100 is able to perform for the particular user profile or account.

Backend system 100 may, in one embodiment, also include a prompts module 270. Prompts module 270, as described in greater detail below with reference to FIG. 2C, may include a listing of responses. The listing of responses may include text data of these responses, as well as a prompt identifier for each response's corresponding text. When backend system 100 attempts to determine what response to provide to electronic device 10, whether it be in response to an utterance or an answer to a question, NLU module 260 may receive one or more prompts that most likely may be used for responding to different utterances based on the format of an invocation. For instance, after an application being enabled, NLU module 260 may receive an indication that a particular prompt is best suited for a response to be sent to electronic device 10 to indicate that the application has been enabled.

Persons of ordinary skill in the art will recognize that although each of ASR module 258, NLU module 260, applications module 262, TTS module 264, user accounts module 268, and prompts module 270 may each include instances of processor(s) 252, storage/memory 254, and communications circuitry 256, and those instances of processor(s) 252, storage/memory 254, and communications circuitry 256 within each of ASR module 258, NLU module 260, applications module 262, TTS module 264, user accounts module 268, and prompts module 270 may differ. For example, the structure, functionality, and style of processor(s) 252 within ASR module 258 may be substantially similar to the structure, functionality, and style of processor(s) 252 within NLU module 260, however the actual processor(s) 252 need not be the same entity.

Figure 2B:
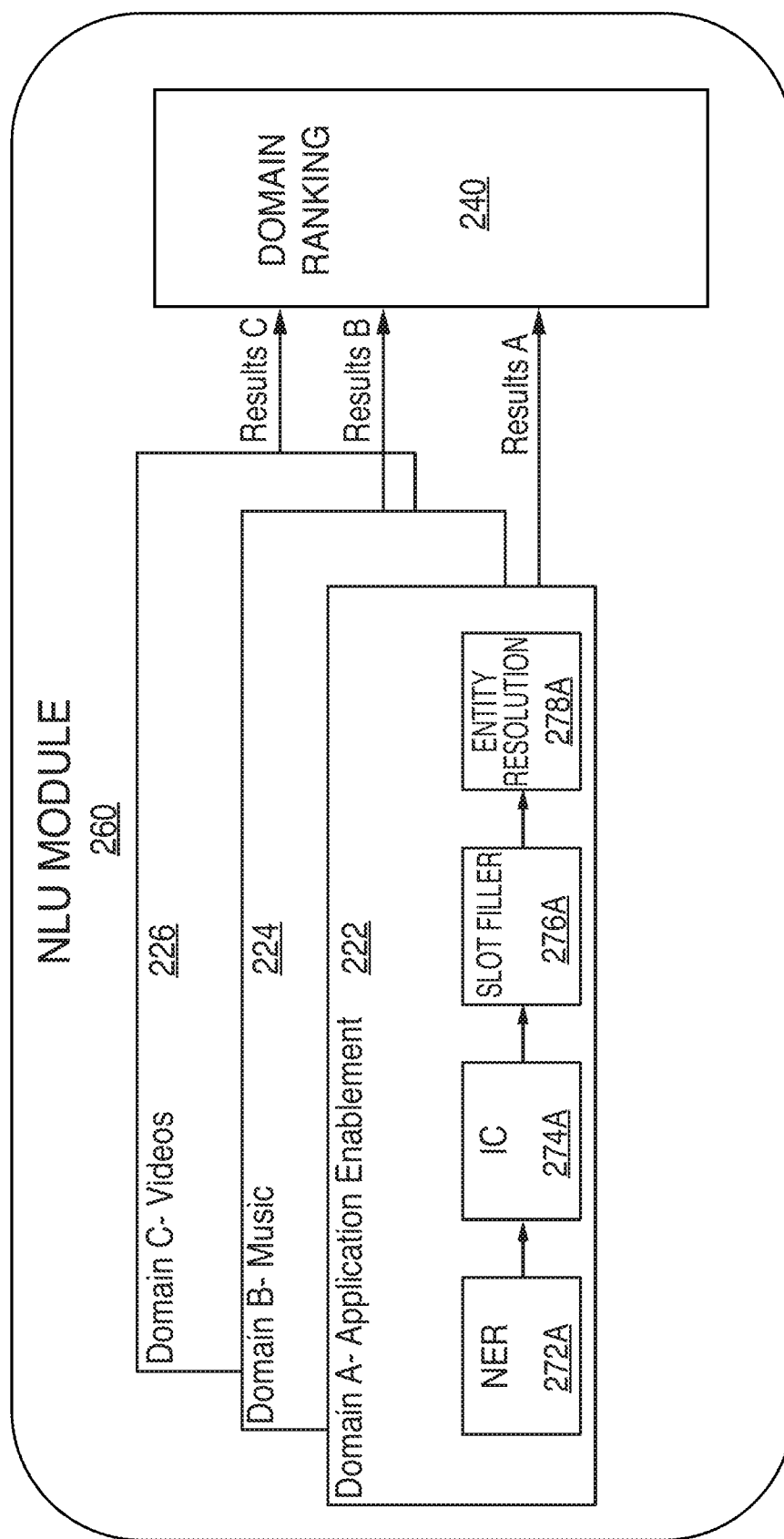
FIG. 2B is an illustrative diagram of a multi-domain architecture for an NLU module of FIG. 2A, in accordance with various embodiments.

FIG. 2B is an illustrative diagram of a multi-domain architecture for NLU module 260 of FIG. 2A, in accordance with various embodiments. In the multi-domain architecture of NLU module 260, each domain (which may include a set of intents and entity slots that define a larger concept such as music, books etc.) is constructed separately and made available to NLU module 260 during runtime operations where natural language understanding functionality operations are performed on text (such as text output from ASR module 258). Each domain may have specially configured components to perform various steps of the NLU operations. For instance, each domain may include a component of NER module 272, IC module 274, Slot Filler module 276, and entity resolution module 278, which may be specific to that particular domain. Furthermore, a language model associated with a particular user account may specify various input and output characteristics of NLU module 260, which may vary from user to user based on that particular user's language model.

For example, an application enablement domain 222 (Domain A) may have an NER component 272-A that identifies what slots, fields, or placeholders (i.e., portions of input text) may correspond to particular entities relevant to that domain. The NER component 272-A may use a machine learning model, such as a domain specific conditional random field ("CRF") to both identify the portions corresponding to an entity as well as identify what type of entity corresponds to the text portion. For example, for the text "Enable Skill 1," an NER component 272-A trained for an application enablement domain may recognize the portion of text (e.g., "Skill 1") corresponds to an entity and an application name. Application enablement domain 222 may also have its own intent classification (IC) component 274-A that determines the intent of the text, assuming that the text is within the proscribed domain. IC components may use a model, such as a domain specific maximum entropy classifier to identify the intent of the text. Application enablement domain 224 may also have its own Slot Filler component 276-A that can apply rules or other instructions to standardize labels or tokens from previous stages into an intent/slot representation. The precise transformation may depend on the domain. For example, a travel domain may include a text mention of "Seattle airport," and may be transform the text mention to the standard three-letter code referring to that airport (e.g., SEA). Application enablement domain 222 may also have its own Entity Resolution component 278-A that can refer to an authority source (such as a domain specific knowledge base) used to specifically identify the precise entity referred to in the entity mention identified in the incoming text. Specific intent/slot combinations may also be tied to a particular source, which may then be used to resolve the text (such as by providing information or a command to be executed in response to a user query). Using the example, "Enable 'Skill 1'," the source may be tied to a listing of applications and the application names associated with those applications. The output from Entity Resolution component 278-A may include a command, information, or other NLU result data indicating how the domain specific NLU processing handled the text and how the system should respond to the text, according to that specific domain.

As another example, a music domain 224 (Domain B) may have an NER component 272-B that identifies what slots (i.e., portions of input text) may correspond to particular entities relevant to that domain. For example, for the text "play songs by Artist1," an NER component 272-B trained for a music domain may recognize the portion of text (e.g., "Artist1") corresponds to an entity and an artist name. Music domain 224 may also have its own intent classification (IC) component 234-B that determines the intent of the text, assuming that the text is within the proscribed domain. Music domain 224 may also have its own Slot Filler component 276-B that can apply rules or other instructions to standardize labels or tokens from previous stages into an intent/slot representation. Music domain 224 may also have its own Entity Resolution component 278-B that can refer to an authority source (such as a domain specific knowledge base) used to specifically identify the precise entity referred to in the entity mention identified in the incoming text. Specific intent/slot combinations may also be tied to a particular source, which may then be used to resolve the text (such as by providing information or a command to be executed in response to a user query). Using the example, "play songs by Artist1," the source may be tied to a personal music catalog or the like. The output from Entity Resolution component 278-B may include a command, information, or other NLU result data indicating how the domain specific NLU processing handled the text and how the system should respond to the text, according to that specific domain.

In some embodiments, the multiple domains of NLU module 260 of FIG. 2B may operate substantially in parallel, with different domain specific components. That is, application enablement domain 222, may have its own NER component 272-a, IC module 274-A, Slot Filler component 276-A, and Entity Resolution component 278-A. Domain B, for music, 224 may also have similar components, and so on for the different domains available to the system. The same text that is input into the NLU pipeline for Domain A—Application Enablement 222 may also be input into the NLU pipeline for Domain B—Music 224, where the components for Domain B 224 may operate on the text as if the text related to domain B, and so on for the different NLU pipelines for the different domains. Each domain specific NLU pipeline will create its own domain specific NLU results, for example Results A for domain A 222, Results B for domain B 224, Results C for domain C 226, and so on. The different results may then be input into a domain ranking component 240, which may ranks the different results for the different domains, and selects what the system believes to be the most applicable results given the input text and other factors. Those highest ranking results may then be used to execute a command, perform one or more actions, or obtain information responsive to a user query, or otherwise respond to the input text.

Such a multi-domain architecture results in narrowly defined intents and slots that are particular for each specific domain. This is due, in part, to the different models and components (such as the domain specific NER component, IC module, etc. and related models) being trained to operate only for the designated domain. Further, the separation of domains results in similar actions being represented separately across the domains even if there is overlap in the action. For example, "next song," "next book," and "next" may all be indicators of the same action, but will be defined differently in different domains due to domain specific processing restrictions. Further, domain agnostic queries that cross domains may be difficult to holistically respond to given the divisions between domains. For example, the query "get Title" may refer to a request to purchase a book, play a movie, or play a soundtrack, but the multi-domain architecture and approach of NLU module 260 of FIG. 2B may result in only one such action being performed with any acknowledgement of ambiguity as the "Title" can refer to a book, movie, or soundtrack (or possibly all three).

Figure 2C:
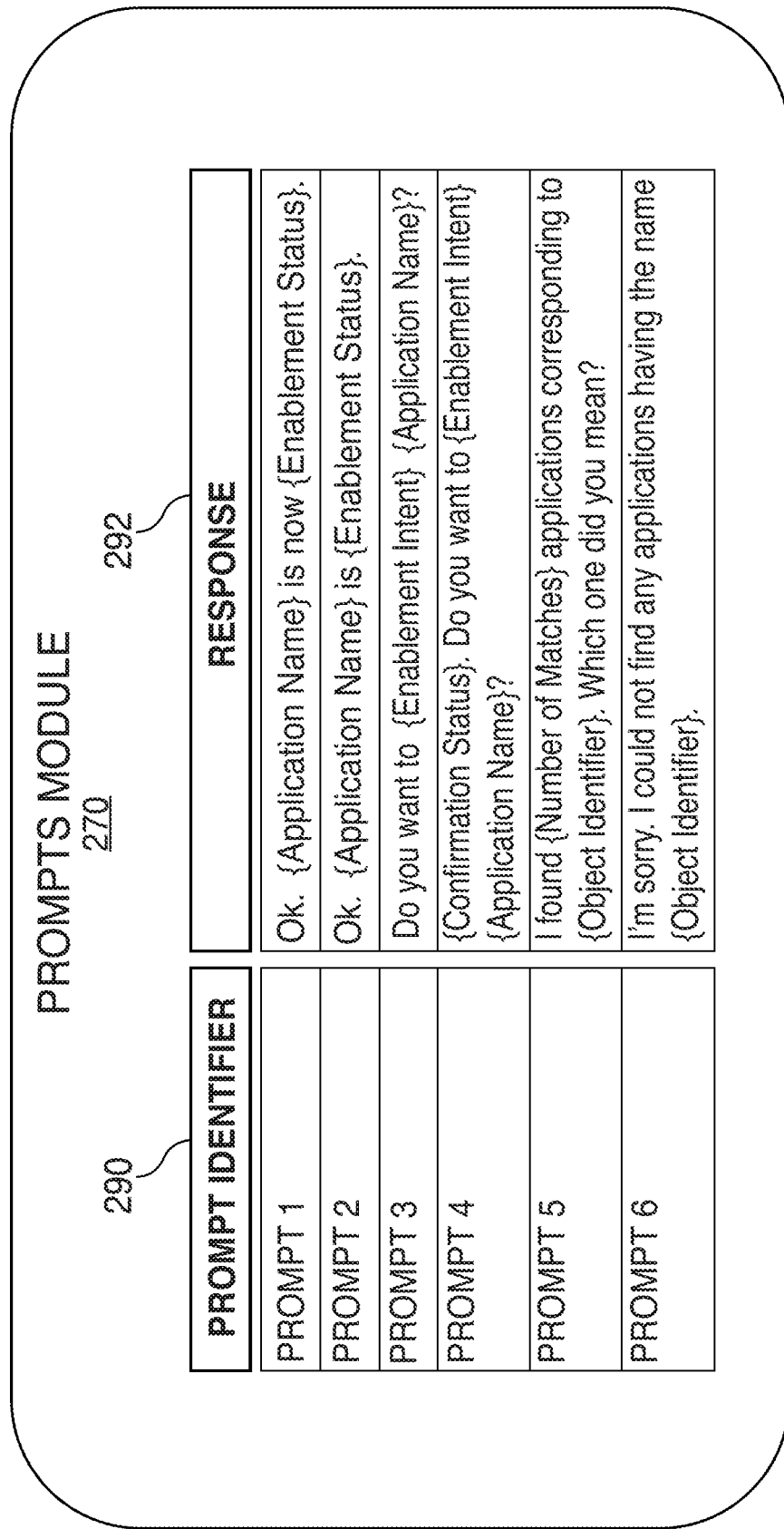
FIG. 2C is an illustrative diagram of a prompts module of FIG. 2C, in accordance with various embodiments.

FIG. 2C is an illustrative diagram of prompts module 270 from FIG. 2A, in accordance with various embodiments. In one non-limiting, illustrative embodiment, prompts module 270 includes a listing of responses, arranged by a prompt identifier and its corresponding text data representation of a response. When a response is needed to be provided to a requesting device, such as electronic device 10, NLU module 260 polls each domain to determine which domain should likely handle providing the response. Each domain may provide one or more prompt identifiers which correspond to a best response, and NLU module selects the prompt identifier having the highest ranking. For example, similarly to how NLU module 260 determined which domain can handle a particular application, NLU module 260 may also determine scores of LOW, MEDIUM, or HIGH, indicating the likelihood that a particular domain can handle the particular response. However, a particular prompt may be selected using any other suitable technique, and the aforementioned is merely exemplary.

Prompts module 270 may, in one embodiment, include prompt identifiers 290 and responses 292. Each prompt identifier may be associated with a particular response, and therefore the text data representing the particular response, such that when a prompt is selected to be used, prompt module 270 is capable of determining that the selected prompt corresponds to a particular response, and the text data representing that response may be provided to TTS module 264, which in turn may generate audio data representing that text data. That audio data, then, may be sent to the requesting device (e.g., electronic device 10), such that an audio message of that response may be output by the requesting device. As an illustrative example, application enablement domain 222 may select prompt 1 for use in responding to utterance 6. Thus, NLU module 260 may send a request to prompts module 270 to send the text data corresponding to the prompt that is associated with the prompt identifier, prompt 1, to TTS module 264. Prompts module 270 may, therefore, send text data representing the response, "Ok. {Application Name} is now {Enablement Status}," to TTS module 264. NLU module 264 may further send the slot results for slot {Application Name} and slot {Enablement Status} to TTS module 264, such that the framework of the selected response is formulated, and the text data representing the response may be used to generate audio data. For example, if {Application Name}: Skill 1, and {Enablement Status}: Enabled, then the response would be, "Ok. 'Skill 1' is enabled."

Persons of ordinary skill in the art will further recognize that various other prompts may be included within prompts module 270. For example, prompts identifier 290 may include prompts 1, 2, 3, 4, 5, 6 . . . L, where L is any number greater than zero (e.g., L>0). Similarly, for however many prompts are included, there may be an associated response. For example, the responses with slots may respectively include, but are not limited to, "{Confirmation Status}. {Application Name} is now {Enablement Status}."; "Ok. {Application Name} is {Enablement Status}."; "Do you want to {Enablement Intent} {Application Name}?"; "I found {Number of Matches} application corresponding to {Object Identifier}. Which one did you mean?"; and "I'm sorry. I could not find any applications have the name {Object Identifier}."

Persons of ordinary skill in the art will further recognize that, in one embodiment, text data representing a response may be generated by backend system 100. For instance, NLU module 260 and/or applications module 262 may be employed to determine contextual features of a response to be generated, and may generate the corresponding text data representing that response. The text data may then be provided to TTS module 264, which may generate audio data representing the text data, which may then be sent to the requesting device.

Figure 3:
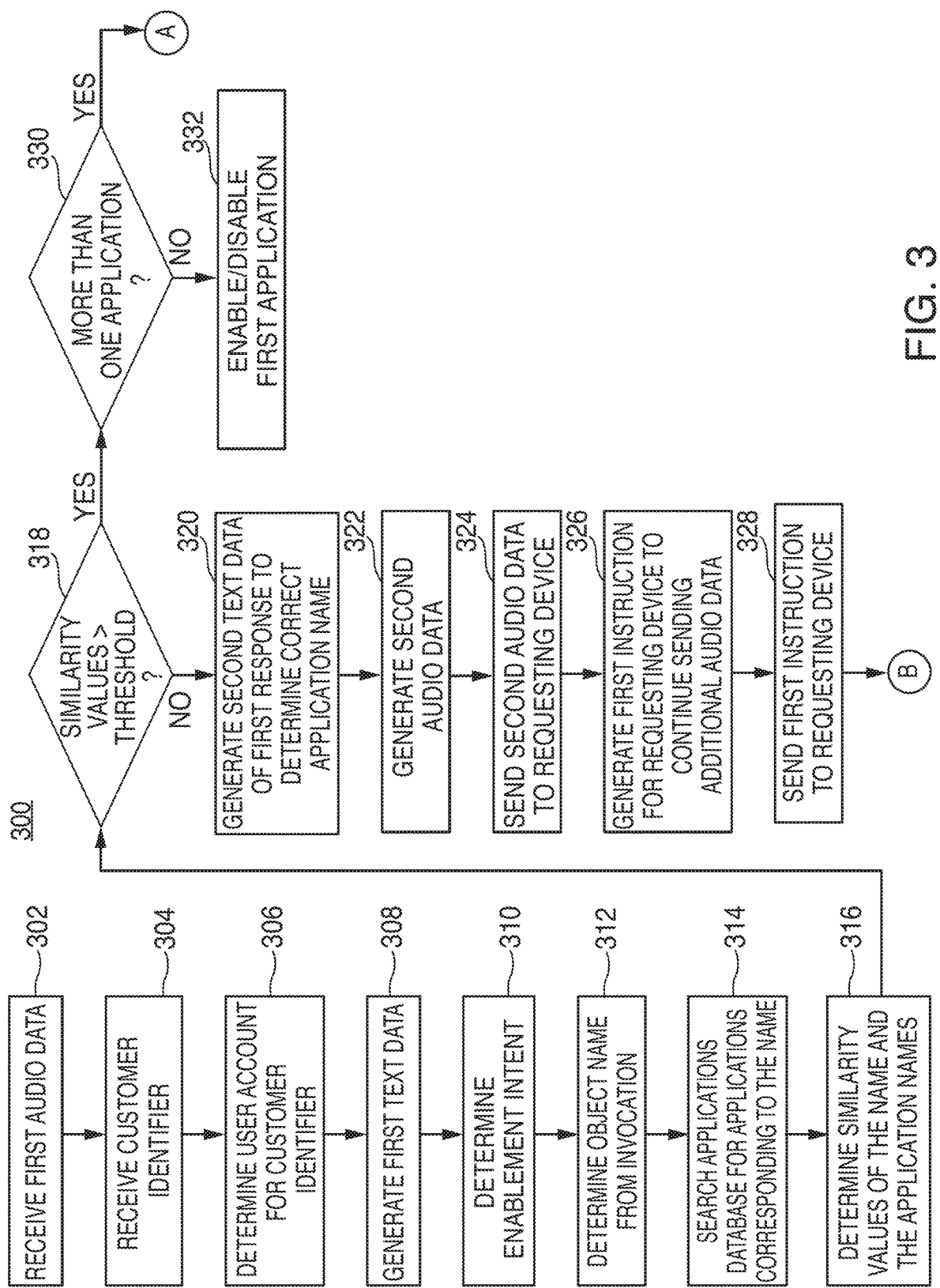
FIG. 3 is an illustrative flowchart of a process for determining one or more applications to be enabled or disabled based on an utterance, in accordance with various embodiments.

FIG. 3 is an illustrative flowchart of a process for determining one or more applications to be enabled based on utterance, in accordance with various embodiments. Process 300 may begin at step 302. At step 302, first audio data may be received at backend system 100 from electronic device 10. The first audio data, such as first audio data 14, may correspond to utterance 4, where individual 2 asks for an application called "Skill 1" to be enabled. For example, individual 2 may say, "Alexa—Enable 'Skill 1'."

At step 304, a customer identifier associated with electronic device 10 may also be received by backend system 100 from electronic device 10 in addition to audio data 14. For instance, the customer identifier may be associated with a user account on backend system 100. At step 306, a user account stored within user accounts module 268 of backend system 100 may be determined that is associated with the customer identification number. For example, electronic device 10 may send a device identification string "ABCD1234" to backend system 100 along with audio data 14. Upon receipt, backend system 100 may query user accounts module 268 to determine a user account that is associated with the device identification string. For instance, a lookup table including customer identifiers and their corresponding user accounts may be included within user accounts module 268 such that a particular user account may be identified based on a customer identifier. Upon determining the user account, backend system 100 may determine various user account settings and configurations associated with the user account. For example, a language model associated with user account may be determined for performing various aspects of speech processing for received audio data.

At step 308, first text data representing the first audio data may be generated. For example, backend system 100 may provide audio data 14 to ASR module 258, which may execute speech-to-text functionality on audio data 14 using STT module 266, thereby generating the first text data. In some embodiments, ASR module 258 may generate N text outputs corresponding to the N most likely text mapped to the first audio data.

At step 310, NLU module 260 may determine that an intent of the first text data is an enablement intent, indicating that an application is to be enabled, and at step 312, an object name of the application from the invocation may be determined. In some embodiments, NLU module 260 may receive the N text outputs from ASR module 258, and may determine which domains are capable of servicing that text. NLU module 260 may determine, using the text outputs, various intents and identifiers, and may determine which domain or domains that those intents and identifiers correspond to. For example, the word, "Enable" or "Disable" may be an enablement intent stored within application enablement domain 222. In response to identifying that utterance 4 includes either of these words, application enablement domain 222 may determine that utterance 4 corresponds to an invocation, and may attempt to match the text to one or more invocation frameworks. In an illustrative embodiment, NLU module 260 may determine that a most likely invocation framework for utterance 4 corresponds to the framework, "{Enablement Intent} {Object Identifier}," where, in this particular instance, {Enablement Intent}: Enable, and {Object Identifier}: Skill 1. Thus, using the invocation framework from NLU module 260, backend system 100 may determine that an intent of utterance 4 is for an application, having an application name "Skill 1," to be enabled for the user account associated with the customer identification number. However, if the enablement intent is determined to correspond to the word, "Disable," then the invocation may be for an application to be disabled.

At step 314, an applications database may be searched for applications that correspond to the application name determined at step 312. As an illustrative example, after the text data, or N text outputs, is generated, an intent of the utterance may be determined using NLU module 260. In some embodiments, NLU module 260 may determine that the first text data is "Enable 'Skill 1'," and may determine that the format of the first text data corresponding to {Intent}: Enable, {Object}: Skill 1. The first text data may then provide each domain with the first text data, and an NER component of each domain may attempt to recognize an entity and an application name associated with the first text data. In the illustrative example, NER component 272-A may recognize that the portion of text—"Skill 1"—corresponds to an entity and an application name, "Skill 1." Then IC component 274-A may determine an intent of the first text data is to enable an application having the application name "Skill 1." Thus, NLU module 260 may use Slot Filler component 276-A to insert, for Application Enablement domain 222, the intent/slot representation "{Intent}: Enable, {Application Name}: Skill 1" for the first text data.

NLU module 260 may further determine, using entity resolution module 238-A, that one or more entities (e.g., an application from applications module 262) that the first text data is associated. For example, applications module 262 may include multiple applications having a name that is related to, or substantially similar to, the application name "Skill 1." For instance, there may be applications titled, "Skill 1," "Daily Skill 1," "Skill 1 Facts," etc. Thus, at step 316, a similarity value may be determined between the application name determined at step 312, and each applications' application name. In some embodiments, NLU module 260 may further winnow down the list of applications with which to determine similarity values from. For example, based on the intent being the word, "Enable," applications associated with application enablement domain 222 may only be used for determining similarity values, however this is merely exemplary. The similarity value or values that are determined may indicate how similar the text of the object (e.g., "Skill 1") and the text of an application name (e.g., application name: "Skill 1") are to one another. In some embodiments, the similarity value may be a percentage indicating how similar the object and the application name are. For instance, if the object is "Skill 1" and the application name is "Skill 1," then the similarity value may be 100%, indicating that the two names match. However, if the object is "Skill 1" and the application name is "Daily Skill 1," then the similarity value may be 66%, indicating that two out of the three words match. However, persons of ordinary skill in the art will recognize that the aforementioned techniques for determining similarity values of the name and the various application names are merely exemplary, and any suitable technique may be employed.

At step 318, a determination may be made as to whether any of the similarity values determined at step 316 are greater than a predefined similarity threshold value. The predefined similarity threshold value, in some embodiments, may be a user adjustable parameter that indicates when the object name of the intent and an application name from the applications database may be considered to match. For instance, using the aforementioned examples, if the predefined similarity threshold value is 75%, then the first example, where the object name "Skill 1" is determined to be 100% similar to the application name "Skill 1," may be declared as corresponding to a match, whereas the second example, where the object name is "Skill 1" is determined to be 66% similar to the application name "Daily Skill 1," may be declared as not being a match because.

If, at step 318, the similarity value(s) are determined to be greater than the predefined similarity threshold value, then process 300 may proceed to step 330, which will be described in greater detail below. However, if the similarity value(s) are determined to be less than or equal to the predefined similarity threshold value, then process 300 may, instead, proceed to step 320. At step 320, second text data representing a first response may be generated, where the first response may correspond to a question or statement that asks for a correct application name to be determined. The second text data may, for instance, be generated and stored by prompts module 270, however this is merely exemplary. In some embodiments, if no application names are determined to match the name of the object determined by NLU module 260, then backend system 100 may attempt to reconcile the name from individual 2 by providing electronic device 10 with a message to output asking to repeat the name of the application that is to be enabled. For example, entity recognition module 270 may include one or more response messages, such as, "Could you repeat that?" or "What was that application called?", so that individual 2 may speak a new utterance clarifying the intent of the previous utterance.

After the second text data representing the first response for determining a correct application name of the original utterance is generated, second audio data may be generated representing the second text data at step 322. For example, the second text data may be sent to TTS module 264, which may execute text-to-speech functionality on the second text data to generate the second audio data. At step 324, the second audio data may be sent to the requesting device, such as electronic device 10, by backend system 100. For instance, the second audio data may be sent to electronic device 10 such that audio of the first response is output by speaker(s) 210 of electronic device 10.

In some embodiments, process 300 may then proceed to step 326 where a first instruction may be generated that causes the requesting device to continue sending additional audio data representing additional audio captured by one or more audio input devices of electronic device 10 to backend system 100. The first response may, as mentioned previously, correspond to a question to help clarify a name of an application with which individual 2 would like to be enabled. Thus, an answer to that question may be needed by backend system 100 to help resolve the appropriate application's identity. Therefore, electronic device 10, which may continually be recording local audio in order to determine whether an utterance of the wakeword is detected, may send that audio to backend system 100 so that backend system 100 may receive the answer. For instance, the first instruction may cause electronic device 10 to send audio data representing local audio captured by microphone(s) 208 after the audio message of the first response is played by speaker(s) 210. So, in response to the audio message of the first response (e.g., "What was the name of the application to be enabled?"), individual 2 may say a new utterance, "Skill 1," and audio data representing the new utterance may then be sent from electronic device 10 to backend system 100. At step 328, the first instruction may be sent from backend system 100 to electronic device 10. Persons of ordinary skill in the art will recognize that, although the second audio data and the first instruction are sent from backend system 100 to electronic device 10 separately, this is merely one exemplary illustration, and the second audio data and the first instruction may be sent in any order or at substantially the same time.

In some embodiments, however, steps 326 and 328 may be optional. For instance, after the second audio data is sent to electronic device 10, individual 2 may, in response to a message indicating that no matching application have been found, have to say the wakeword again prior to saying the correct application name to be enabled. For example, electronic device 10 outputting a message, "I didn't find any matches. Can you say that again?" In response, an individual may say, "Alexa—Enable 'Skill 1'." In one embodiment, electronic device 10 may be a manually activated electronic device, and a manual input may be needed prior to saying the utterance, "Enable 'Skill 1'," as opposed to having to include the wakeword, "Alexa."

If, however, at step 318, it is determined that there are similarity values that do exceed the predefined similarity threshold value, then process 300 may proceed to step 330. At step 330, a determination is made as to whether there were more than one (e.g., two or more) similarity values that exceeded the similarity threshold value. If, at step 330, it is determined that only one application name, when compared with the name from the utterance (e.g., Object: {Skill 1}), exceeds the predefined similarity threshold value, then process 300 may proceed to step 332.

At step 332, the application functionality associated with the application that had the only similarity value in excess of the threshold, may be enabled for the user account. For example, an updated language model may be generated, which may be based on a previous language model of the user account, which may now include one or more invocation phrases that may be used for invoking the application. Furthermore, the updated language model may include one or more sample utterance templates, including one or more slots, fields, or placeholders capable of being used for determining whether an additional utterance has a same format of one of the sample utterance templates for that application. Additionally, the updated language model may include one or more sample response templates, including one or more response slots, fields, or placeholders, capable being used for responding to a subsequent utterance associated with that application. Still further, the updated language model may include one or more slot, field, or placeholder values for the application, to be used with one of the application response slots, fields, or placeholders, for response generation.

Figure 4:
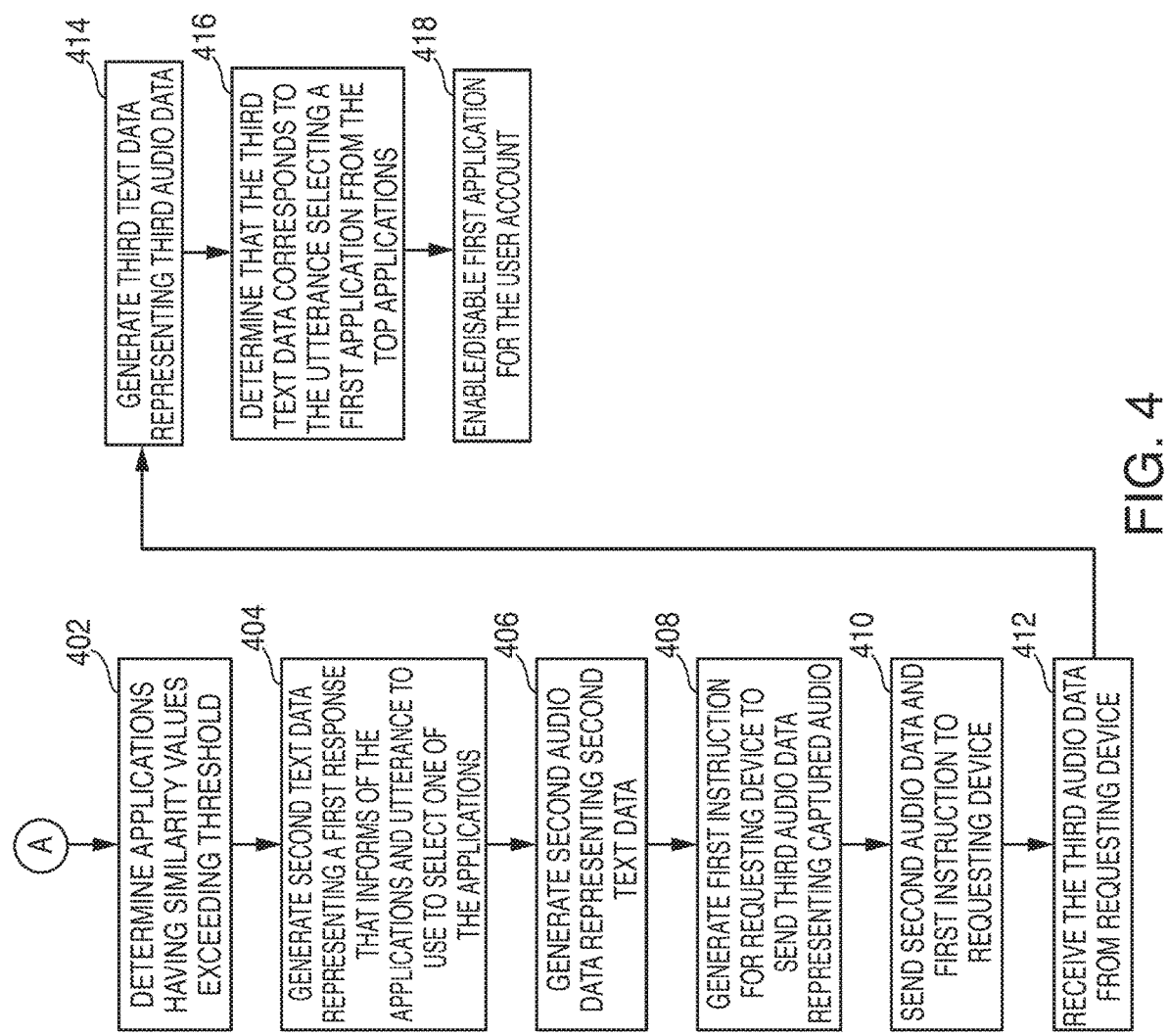
FIG. 4 is an illustrative flowchart of a process for determining an application to enable from more than one application that matches the application's name, in accordance with various embodiments.

FIG. 4 is an illustrative flowchart of a process for determining an application to enable from more than one application that matches the application's name, in accordance with various embodiments. In some embodiments, process 300 of FIG. 3 may proceed to step 402 of process 400 if, at step 330, it was determined that there were more than one application that had a similarity value that exceeded the predefined similarity threshold value. For instance, if there were two or more applications whose application names were determined to match the name from the utterance, then process 300 may proceed from step 330 to step 402 of process 400.

At step 402, in some embodiments, the applications that have similarity values exceeding a predefined similarity threshold may be determined. For instance, there may be a large number of applications whose application names yielded similarity values, when compared with the name from the utterance (e.g., {Object}: Skill 1), that exceeded the similarity threshold value. In this particular scenario, a top N ranked applications may be selected so that backend system 100 may check back with individual 2 to see which of the N applications he/she would like to enable/disable. As an illustrative example, there may be ten applications whose application names substantially match the uttered application name, "Skill 1." Thus, the top three, for example, applications whose application names yielded the top three similarity values may be selected. Persons of ordinary skill in the art will recognize, however, that any number of applications may be selected. For instance, N may correspond to two applications, three applications, five applications, etc.

At step 404, second text data representing a first response may be generated, or received from a prompts module, where the first response informs an individual who spoke the utterance (e.g., individual 2 saying utterance 4) of the top applications found to match their requested application. The first response, in one embodiment, may be selected from a listing of responses stored within the prompts module. Furthermore, the first response may also ask for a selection to be made of one of the applications found to match the name from the utterance. For example, based on utterance 4, there may have been three applications found whose application names substantially match the name of the program that was requested to be enabled from utterance 4. Thus, the first response that is selected from the prompts module may be of the form, "I Found {Number of Matches} Applications corresponding to {Object Identifier}: {Application Name 1}, {Application Name 2}, and {Application Name 3}. Which one did you mean?" For instance, the application names, "Skill 1," "Daily Skill 1," "Skill 1 Facts," may each have garnered similarity values when compared with the name, "Skill 1," from utterance 4. Therefore, the first response may be, "I found three applications corresponding to 'Skill 1': Skill 1', 'Daily Skill 1', and 'Skill 1 Facts'. Which one did you mean?" As yet another example, the first response may indicate the matching applications, as well as a sample utterance that may be used to enable the particular application. For instance, "I found three applications corresponding to 'Skill 1': 'Skill 1', 'Daily Skill 1', and 'Skill 1 Facts'. To enable the application, say "Alexa—Enable . . . "

At step 406, second audio data representing the second text data may be generated. For example, text-to-speech functionality may be executed on the second text data to generate the second audio data by TTS module 264.

At step 408, a first instruction may be generated that causes the requesting device (e.g., electronic device 10) to send third audio data to backend system 100. The third audio data may represent audio captured by microphone(s) 208 of electronic device 10 after an audio message of the first response is played by speaker(s) 210 of electronic device 10. As mentioned above, the first response may include a question that asks individual 2 to select an application, and therefore the first instruction may be sent so that electronic device 10 may send audio data representing the answer to the question to backend system 100, without individual 2 having to provide an additional utterance of the wakeword. In response to sending the second audio data, electronic device 10 may, for instance, be caused to output an audio message of the first response, "I found three applications corresponding to 'Skill 1': 'Skill 1', 'Daily Skill 1', and 'Skill 1 Facts'. Which one did you mean?" Electronic device 10 may further be caused to send local audio captured after the audio message plays to backend system 100.

Step 408 may be optional, in one embodiment. In this particular instance, individual 2 may preface their invocation with the wakeword for electronic device 10 (e.g., "Alexa"), followed by the enablement utterance for the particular application. At step 410, the second audio data and the first instruction may be sent to the requesting device (e.g., electronic device 10). Step 410 may also be optional, such that if step 408 occurs, step 410 may also occur.

At step 412, third audio data may be received at backend system 100 from the requesting device. After the audio message is played by speaker(s) 210, individual 2 may speak an additional utterance that selects which of the applications' names they would like to have enabled. For instance, individual 2 may say, "Alexa—Enable 'Skill 1,'" meaning that the application name "Skill 1" (corresponding to {Application Name 1}) is to be selected. Electronic device 10, which received audio data representing the utterance using microphone(s) 208, may send third audio data representing this utterance to backend system 100. Upon receipt, backend system 100 may provide the third audio data to ASR module 258, such that third text data representing the third audio data may be generated, at step 414.

In some embodiments, however, individual 2 may not need to say the wakeword, "Alexa," or even the action "Enable." For instance, if backend system 100 sends the first instruction to electronic device 10, causing electronic device 10 to continually send audio data representing sounds received by microphone(s) 208, then individual 2 may only need to say the selected application name that they wish to have be enabled.

At step 416, a determination may be made that the third text data corresponds to an utterance selecting, or requesting, that a first application be enabled. For example, individual 2 may have said, "Alexa—Enable Daily Skill 1'," in response to the audio message, "I found three applications corresponding to 'Skill 1': 'Skill 1', 'Daily Skill 1', and 'Skill 1 Facts'. To enable one of these applications, say: 'Alexa—Enable . . . " After the third text data is generated, therefore, it may be provided to NLU module 260, which determines that the intent of this utterance is a selection of the first application having the first application name, "Daily Skill 1," and not the second or third applications, having application names, "Skill 1" and "Skill 1 Facts," respectively.

At step 418, the first application may be enabled for the user account associated with the requesting device. This may correspond to updating a language model for the user account such that a current language model now also includes one or more invocation phrases that may be used for invoking the application. Furthermore, the updated language model may include one or more sample utterance templates, including one or more slots, fields, or placeholders capable of being used for determining whether an additional utterance has a same format of one of the sample utterance templates for that application. Additionally, the updated language model may include one or more sample response templates, including one or more response slots, fields, or placeholders, capable of selecting one of the sample response templates to use for responding to a subsequent utterance associated with that application. Still further, the updated language model may include one or more slot, field, or placeholder values for the application, to be used with one of the application response slots, fields, or placeholders. As an example, individual 2, having a user account on backend system 100, may have the application entitled "Skill 1" enabled. In some embodiments, enabling the application may include providing NLU module 260 with one or more additional rules. The rules that are included with NLU module 260 for the application may cause certain invocations, if detected by NLU module 260, to be serviced using that application. For example, if the application that is enabled is the "Skill 1" application, then invocations that are related to, or directed towards, the Skill 1 application may cause the Skill 1 application to perform one or more actions, such as providing response information to the invocation. As an illustrative example, if the application to be enabled is Skill 1, then NLU module 260, for the particular user account with which the enablement request was associated, may be provided with a rule that for invocations of the form, "Alexa—Tell me a fact using the Skill 1 application," NLU module 260 is to call the Skill 1 application to obtain information. The enabling and disabling of an application, and its effects to NLU module 260 are described in greater detail below, and the aforementioned is merely for illustrative purposes. Enabling an application, and conversely disabling an application, is described in greater detail below with reference to FIG. 9. Depending on the enablement intent determined previously (e.g., {Enablement Intent}: Enable, or {Enablement Intent: Disable), the appropriate action of enabling or disabling a particular application may occur.

Figure 5:
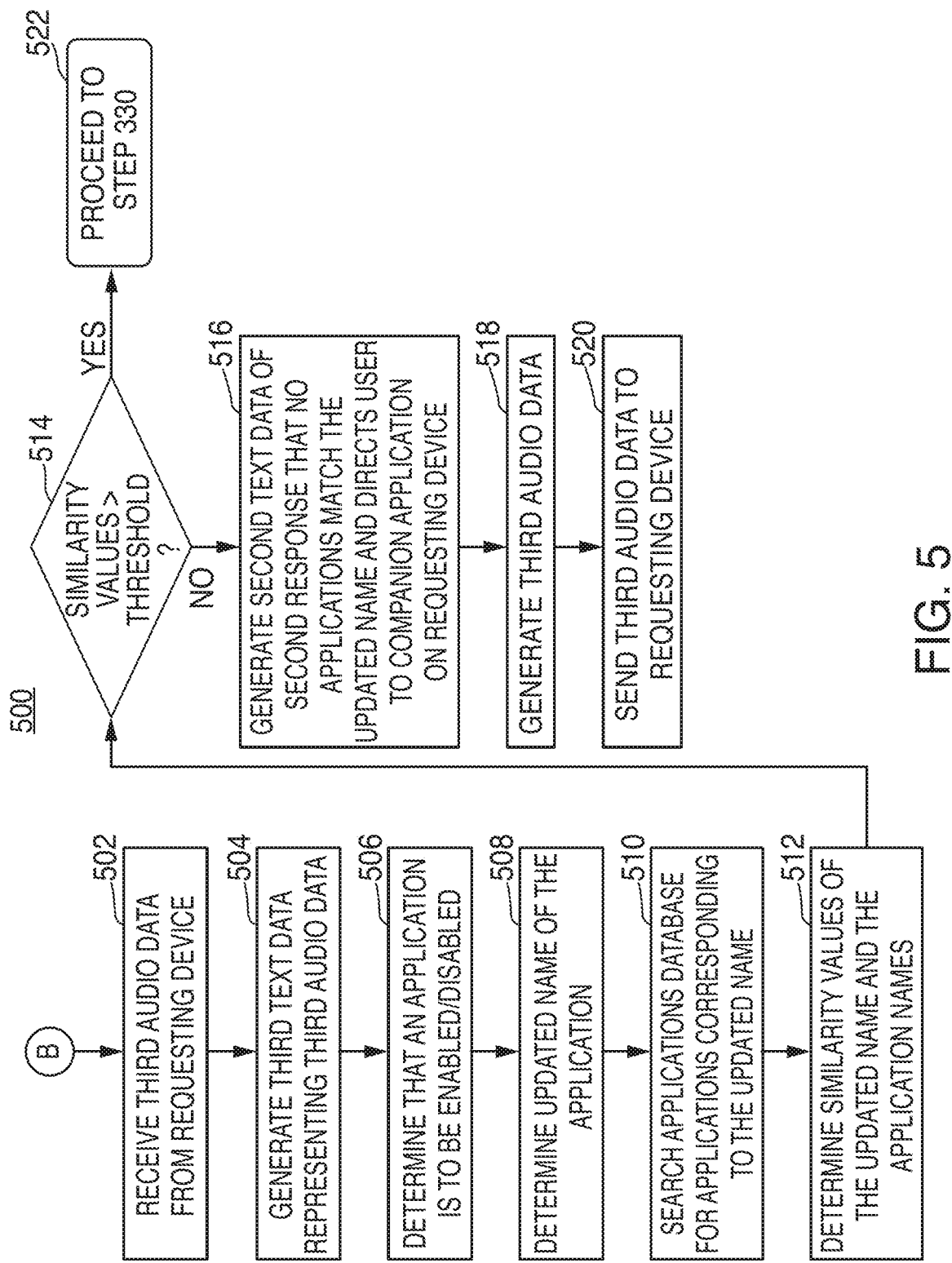
FIG. 5 is an illustrative flowchart of a process for determining an application to be enabled/disabled, or that no application could be determined for enablement, in accordance with various embodiments.

FIG. 5 is an illustrative flowchart of a process for determining an application to be enabled/disabled, or that no application could be determined for enablement, in accordance with various embodiments. Process 500 may begin at step 502. In some embodiments, after step 328 of FIG. 3, process 300 may proceed to step 502 of FIG. 5. In this particular scenario, no application names of applications included within the applications database yielded a similarity value in excess of the similarity threshold value, and therefore a message was sent to the requesting device for an individual to provide the correct application name. At step 502, third audio data may be received from a requesting device. For example, in response to the audio message, "What was the name of the application to be enabled?", individual 2 may speak an additional utterance, "Alexa— Enable 'Skill 1'." In some embodiments, if the instruction of step 326 was sent, individual 2 may simply speak the utterance "Skill 1." Microphone(s) 208 of electronic device 10 may have received audio signals of the additional utterance, and, because electronic device 10 also received the first instruction, the third audio data representing the additional utterance may be sent from electronic device 10 to backend system 100.

At step 504, third text data representing the third audio data may be generated. Upon receipt, backend system 100 may provide the third audio data to ASR module 258, which may use STT module 266 to execute speech-to-text functionality on the third audio data to generate the third text data. After the third text data is generated, process 500 may proceed to step 506 where NLU module 260 may determine, using the third text data, that the additional utterance indicated that an application is to be enabled or disabled. In some embodiments, NLU module 260 may determine that the additional utterance substantially matches a format of an invocation for Application Enablement domain 222. For instance, one exemplary invocation for application enablement domain 222 may be, "{Enablement Indicator} {Application Name}." Therefore, the additional utterance may be of this format (e.g., "Alexa—Enable 'Skill 1'"). NLU module 260 may determine that, because {Enablement Indicator}: Enable, that an application is to be enabled. Furthermore, at step 508, NLU module 260 may determine an updated name of the application. For example, NLU module 260 may determine that the application name is supposed to be Skill 1, and that this application is to be enabled based on the enablement intent.

At step 510, the applications database (e.g., applications database 30) may be searched for any and all applications that may correspond to the application name from the additional utterance. At step 512, similarity values between the name from the additional utterance and the application names of applications from the applications database may be determined. At step 514, a determination may be made as to whether any of the similarity values are greater than the similarity threshold value. In some embodiments, the similarity threshold value of step 514 may be the same as the similarity threshold value of step 314, however this is not required, and two different similarity threshold values may be used. Furthermore, steps 510, 512, and 514 of FIG. 5 may, in an illustrative embodiment, be substantially similar to steps 310, 312, and 314 of FIG. 3, and the previous descriptions may apply.

If, at step 514, it is determined that there is at least one similarity value that is greater than the similarity threshold value, then process 500 may proceed to step 522, which may correspond to step 330 of process 300. At step 330, another determination is made as to whether there is one or more similarity values that exceeds the similarity threshold value. However, if at step 514 it is determined that there are no similarity values that exceed the similarity threshold value, then process 500 may proceed to step 516. At step 516, fourth text data of a second response may be received by TTS module 264. The second response may be obtained from the listing of responses from the prompts module, and may indicate that no applications were found to substantially match the name of the application named within the utterance(s). For example, there may be no applications corresponding to the name "Skill 1," and therefore prompts module 270 may provide TTS module 264 with text data representing a second response to reflect this. As an illustrative example, a selected response in this scenario may be of the form, "I'm sorry. I could not find any applications having the name {Object Identifier}." Thus, if the name of the application from the utterance was "Skill 1," then the second response would correspond to, "I'm sorry. I could not find any applications having the name 'Skill 1'." In some embodiments, the second response may further direct individual 2 to access a companion application on the requesting device (e.g., electronic device 10), or any other suitable device, to manually select the appropriate application. For example, the second response may be, "I'm sorry. I could not find any applications having the name 'Skill 1'. Please go to your Companion App on your device to select the application."

At step 518, fourth audio data representing the fourth text data may be generated using TTS module 264. For example, TTS module 264 may execute text-to-speech functionality on the fourth text data to generate the fourth audio data. At step 520, the fourth audio data may be sent from backend system 100 to the requesting device. For example, the fourth audio data representing the response "I'm sorry. I could not find any applications having the name 'Skill 1'. Please go to your Companion App on your device to select the application," may be sent to electronic device 10, such that an audio message of the response is played by speaker(s) 210 of electronic device 10.

Figure 6:
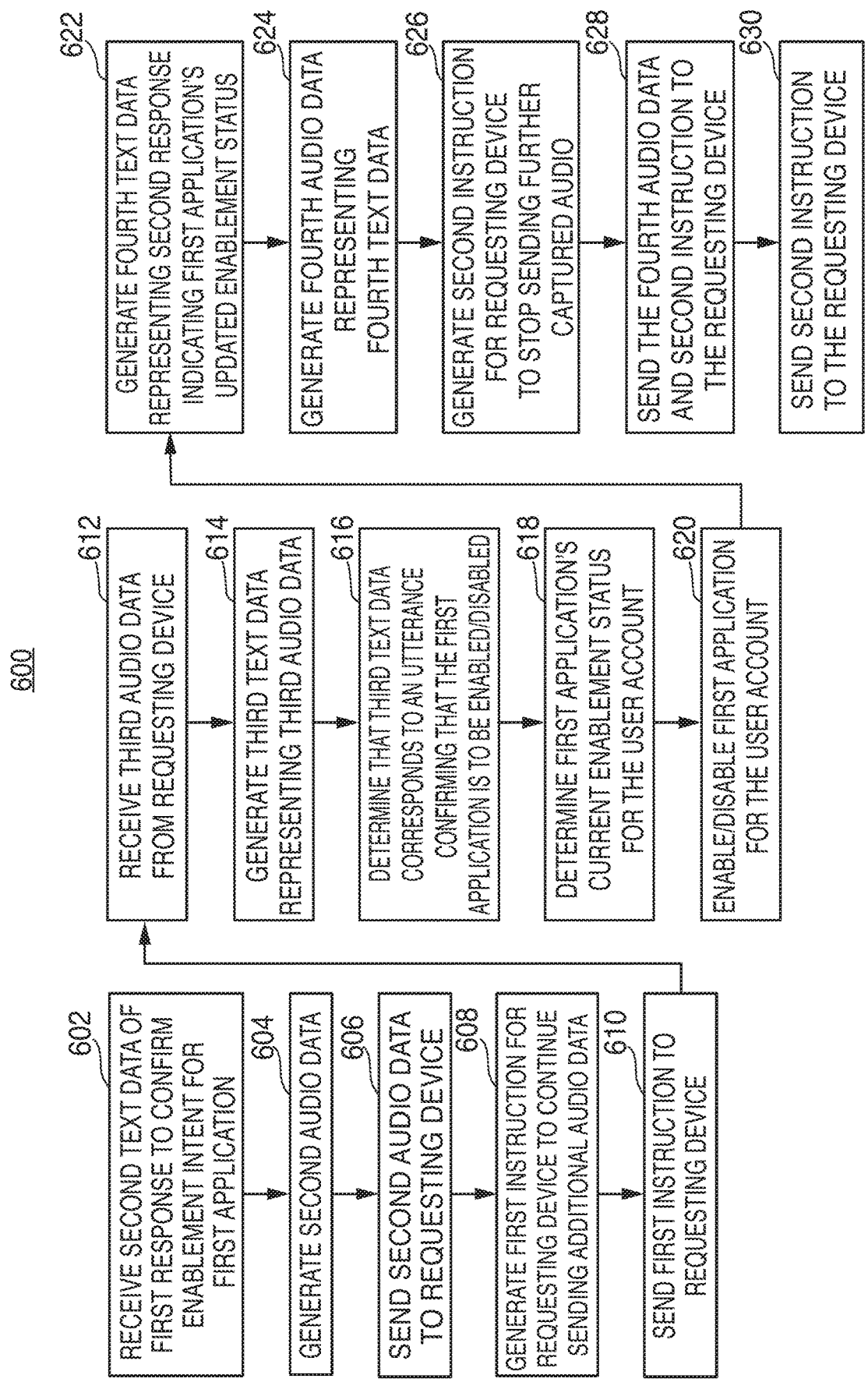
FIG. 6 is an illustrative flowchart of a process for causing an application to be enabled/disabled in response to receiving a confirmation utterance to enable/disable the application, in accordance with various embodiments.

FIG. 6 is an illustrative flowchart of a process for causing an application to be enabled/disabled in response to receiving a confirmation utterance to enable/disable the application, in accordance with various embodiments. In some embodiments, process 600 may correspond to a continuation of process 300, 400, and/or 500. Process 600, for instance, may occur prior to an application being enabled, such as at step 332 of process 300. In general, process 600 may allow backend system 100 to have a dynamic conversation with individual 2 such that confirmation of whether or not the correct application has been correctly identified may occur, as well as providing individual 2 with assurance that the requested application has, in fact, been enabled (or disabled).

Process 600 may begin at step 602. At step 602, second text data representing a first response may be received, where the first response is to confirm that the first application having the first application name is to be enabled. The first application having the first application name, for instance, may correspond to the application whose name had a similarity value that, when compared with the name from the utterance, was determined to exceed the predefined similarity threshold value. In one embodiment, the first response may correspond to a message that informs an individual operating electronic device 10, as well as confirms that the determined application should be enabled for the individual's user account. For example, the first response may be, "Do you want to enable 'Skill 1'?" The second text data may be received by TTS module 264 from prompts module 270. In some embodiments, prompts module 270 includes a listing of responses based on the determined intent's features, may include text data of each response of the listing. When a particular utterance having a particular form is determined, a corresponding text response may be selected. For instance, if utterance 4 is, "Alexa—Enable 'Skill 1'," having a form "{Wakeword}: Alexa; {Intent}: Enable an Application; {Application Name}: Skill 1," then a response message may be selected of the form "{Confirmation Status}: Ok; {Question Initiator}: Do; {Pronoun}: You; {Verb}: Want; {Preposition}: To; {Action}: Enable; {Application Name}: Skill 1," (e.g., "Ok. Do you want to enable 'Skill 1'?"). As another example, the response message that is selected may have the form "So you want me to enable 'Skill 1'?" In some embodiments, the individual may need to say the wakeword (e.g., "Alexa") prior to saying their answer to the response message. In this particular scenario, the response message may also include an instruction for how the individual may enable the application (or conversely disable the application). For example, the response message may be, "Do you want to enable 'Skill 1'? If so, say: 'Alexa—Enable 'Skill 1'." At step 604, TTS module 264 may generate second audio data representing the second text data by executing text-to-speech functionality on the second text data. At step 606, the second audio data may be sent to the requesting device (e.g., electronic device 10).

At step 608, a first instruction may be generated for the requesting device to continue sending additional audio data representing audio captured after the audio message of the first response is output by the requesting device. In some embodiments, step 338 may be substantially similar to step 326, with the exception that the latter corresponds to a first response that confirms that the determined application is to be enabled (e.g., "Ok. Do you want to enable 'Skill 1'?"). Furthermore, at step 610, the first instruction may be sent to the requesting device. In the illustrative embodiment, step 610 may be substantially similar to step 328, and the previous description may apply. Furthermore, in some embodiments, steps 608 and 610 may be optional. For instance, individual 2 may, prior to providing their confirmation message to the first response, need to utter the wakeword for electronic device 10 (e.g., "Alexa—Enable 'Skill 1'.").

At step 612, third audio data may be received from the requesting device. The third audio data may represent an additional utterance spoken by individual 2 after an audio message was played. For example, in response to audio message 6, individual 2 may speak utterance 8, and electronic device 10 may send audio data representing utterance 8 to backend system 100.

At step 614, third text data representing the third audio data may be generated. Upon receipt, backend system 100 may provide the third audio data representing utterance 8, for example, to ASR module 258, which may use STT module 266 to execute speech-to-text functionality on the third audio data to generate the third text data. At step 616, a determination may be made that the third text data corresponds to an utterance (e.g., utterance 8) that confirms that the first application is to be enabled or disabled. In some embodiments, the third text data may be provided to NLU module 260, which may determine an intent of the spoken utterance using the third text data. For example, because utterance 8 was likely provided in response to the confirmation message 6, NLU module 260 may determine whether the third text data indicates that the correct application was determined, and whether that application is to be enabled or disabled. As an illustrative example, NLU module 260 may determine that appropriate responses may be, "Yes," "No," "That is correct," "That is incorrect," etc. Thus, upon generating the third text data, NLU module 260 may determine the likely answer to the provided confirmation message, and may determine one or more actions to occur in response (e.g., enable an application, disable an application, ask a follow-up question, etc.). As another example, NLU module 260 may determine that the response was, "Alexa—Enable 'Skill 1 Facts'."

In some embodiments, at step 618, backend system 100 may determine enablement status for applications are currently associated with the user account. For instance, electronic device 10, operated by individual 2, may be associated with a user account on user accounts module 268 for individual 2. The user account may already have various applications enabled, such as a weather application, a traffic application, a music playing application, and the like. At step 618, backend system 100 may poll the user account to determine whether the first application (e.g., "Skill 1") is currently enabled for that user account. If so, then backend system 100 may not need to enable the application, and may simply allow for subsequent commands to be directed to that application if appropriate. However, if that application is not currently enabled for the user account, backend system 100 may begin the process of enabling that application for the user account. In some embodiments, step 618 may be optional, and need not be performed. In this scenario, process 600 may proceed from step 616 to step 620.

At step 620, the first application may be enabled or disabled for the user account. In some embodiments, enabling the application may include providing NLU module 260 with one or more additional rules, while disabling the application may include removing one or more rules from NLU module 260. The rules that are included with NLU module 260 for the application may cause certain invocations, if detected by NLU module 260, to be serviced using that application. For example, if the application that is enabled is the "Skill 1" application, then invocations, which are related to, or directed towards, the Skill 1 application, may cause the Skill 1 application to perform one or more actions, such as providing response information to the invocation. As an illustrative example, if the application to be enabled is Skill 1, then NLU module 260, for the particular user account with which the enablement request was associated, may be provided with a rule that for invocations of the form, "Alexa—Tell me a fact using 'Skill 1 Facts'," NLU module 260 is to call the Skill 1 application to obtain information. Furthermore, enabling an application may correspond to one or more invocation phrases being added to the individual's user account that may be used for invoking the application. Furthermore, one or more sample utterance templates, including one or more slots, fields, or placeholders may be added to the individual's user account such the NLU module is capable of determining whether an additional utterance has a same format of one of the sample utterance templates for that application. Additionally, one or more sample response templates, including one or more response slots, fields, or placeholders, may be added to the individual's user account such that the NLU module is capable of selecting one of the sample response templates to use for responding to a subsequent utterance associated with that application. Still further, one or more slot, field, or placeholder values for the application, to be used with one of the application response slots, fields, or placeholders, may also be added to the individual's user account.

If, however, the application is to be disabled, then this may correspond to removing one or more invocation phrases from the individual's user account such that they are no longer able to be used to invoke the application. Furthermore, one or more sample utterance templates, including one or more slots, fields, or placeholders may be removed to the individual's user account such the NLU module, one or more sample response templates may be removed from the individual's user account, and one or more slot, field, or placeholder values for the application may also be removed to the individual's user account.

Process 600, in some embodiments, may then proceed to step 622, where fourth text data representing a second response may be received by TTS module 264, where the second response indicates an updated enablement status of the first application. In some embodiments, the second response may be selected from the listing of responses from the prompts module based on one or more of the rules provided to NLU module 260. For instance, in response to enabling the application, a response may be selected that indicates that the requested application is now enabled. For example, the second response may be of the form, "Ok. {Application Name} is {Enablement Status}," where {Application Name} corresponds to the application name of the application that was enabled (e.g., "Skill 1"), and {Enablement Status} corresponds to whether that application is now enabled or disabled (e.g., "enabled").

At step 624, TTS module 264 may generate fourth audio data representing the fourth text data by executing text-to-speech functionality on the fourth text data. At step 626, a second instruction may be generated that causes the requesting device to stop sending any audio that was further captured by the requesting device after the requesting device plays an audio message of the second response. At step 628, the fourth audio data and the second instruction are sent to the requesting device from the backend system. For example, in response to being sent audio data 22, electronic device 10 may play audio message 12, "Ok. 'Skill 1' is now enabled" using speaker(s) 210. Persons of ordinary skill in the art will recognize that, in some embodiments, the second instruction of step 626 and 628 may be optional. For instance, instead of sending the second instruction such that the electronic device stops sending further captured audio, the electronic device may stop sending audio in response to determining a speech endpoint of the utterance.

Figure 7:
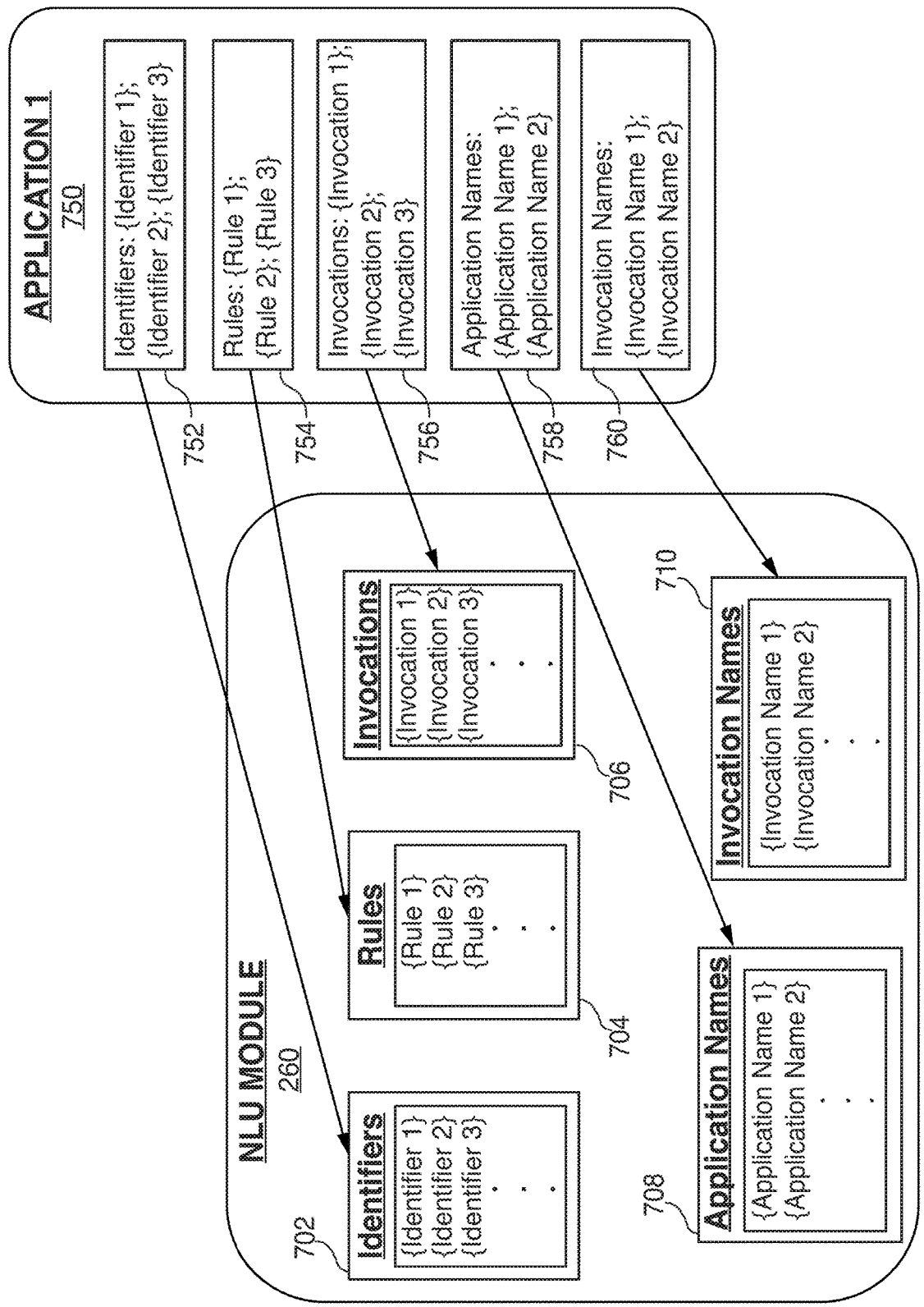
FIG. 7 is an illustrative diagram of the NLU module of FIGS. 2A and 2B being provided with various identifiers, rules, invocations, application names, and invocation names associated with a first application, in accordance with various embodiments.

FIG. 7 is an illustrative diagram of the NLU module of FIGS. 2A and 2B being provided with various identifiers, rules, invocations, application names, and invocation names associated with a first application, in accordance with various embodiments. When a new application is available for use by backend system 100, that application may provide NLU module 260 with various keywords and sentence frameworks for updating a current language model for the user account. Those keywords and sentence frameworks may be compared against the N text outputs from ASR module 258. If one or more of the text outputs match, to a certain confidence level, one of the sentence frameworks, or include one of the keywords, then that particular application corresponding to those keywords and/or sentence frameworks may be queried for a response.

As one illustrative, non-limiting embodiment, an application 750 may include one or more identifiers 752, rules 754, invocations 756, application names 758, and invocation names 760. Identifiers 752, in the illustrative embodiment, may include {Identifier 1}, {Identifier 2}, {Identifier 3} and so on, which each correspond to one or more words that, if determined to be included within a text output from ASR module 258, may signify that application 750 may be used to service the query. For example, if application 750 corresponds to a weather application, then some exemplary identifiers may be: {Identifier 1}: Weather; {Identifier 2}: Forecast; {Identifier 3}: Rain, etc. Therefore, if an utterance made by an individual to their voice activated electronic device includes the question, "What is the weather?", NLU module 260 may recognize that the text of the utterance includes an instance of {Identifier 1}: Weather, and may call application 750 to handle responding to the utterance.

Rules 754, in the illustrative embodiment, may include {Rule 1}, {Rule 2}, {Rule 3} and so on, which each may correspond to one or more actions that may be performed in response to NLU module 260 requesting that application 750 handle a particular query. As one example, if the utterance was inquiring about the current weather conditions, one or more rules 754 may cause application 750 to obtain a current weather forecast for a geographic location associated with an IP address of the requesting device. Rules 754 may further cause one or more actions to be performed by the requesting device or by an additional device. For example, rules 754 may cause content to be output on a particular device based on the received utterance.

Invocations 756 may, in one embodiment, include various invocation frameworks, {Invocation 1}, {Invocation 2}, {Invocation 3}, which correspond to sample sentence structures associated with different invocations. For example, an invocation to enable application 750 may have the format, "{Identifier 1} {Application Name 1}," or "{Identifier 2} {Invocation Name 1}," and so on. When NLU module 260 receives the text outputs from ASR module 258, the text outputs may be compared against the various invocation frameworks to determine which invocation framework is a most probable match. In some embodiments, NLU module 750 may first identify an enablement intent as one of the identifiers 752, and then based on the enablement identifier, may refine the search of invocations 756 to only search for invocations including the specific enablement intent. For example, if {Identifier 1} is "Enable," then invocations 756 including an enablement intent identifier therein may be used to determine which invocation is most likely to match the text output.

Application names 758 and invocation names 760 may both correspond to names that may be used to invoke a particular application. For example, an application name may be associated with a particular application's title (e.g., "Weather," "Traffic," "Skill 1," "Movie Trivia," etc.), whereas an invocation name may be associated with the application's title as well as one or more additional words. For instance, an invocation name for a weather application titled, "Weather," may have an invocation name, "Weather Application," or "My Weather Application." Similarly, an invocation for an application titled, "TV Show Trivia," may have an invocation name, "TV Show Fan Trivia" or "TV Show Fan Trivia Application." In some embodiments, however, NLU module 260 may be flexible, and capable of determining a most likely application associated with the utterance. For example, if the utterance is "What is the weather?", NLU module 260 may be capable of determining that the utterance includes the word, "weather", and therefore may determine an application that may be used for responding to the utterance.

In some embodiments, each application included within applications module 262 may provide NLU module 260 with the various identifiers 752, Rules 754, Invocations 756, Application Names 758, and Invocation Names 760 associated with a particular application. NLU module 260 may, therefore, store the various identifiers, rules, invocations, application names, and invocation names, for each application within an identifier database 702, rules database 704, invocations database 706, application names database 708, and invocation names database 710, respectively. Thus, each time ASR module 258 generates the N text outputs based on received audio data representing an utterance, NLU module 260 may use the propagated fields of identifier database 702, rules database 704, invocations database 706, application names database 708, and invocation names database 710 to determine a most likely application or applications that may handle responding to the query, and may cause one or more of those applications to obtain response information for the query and/or perform one or more actions.

Figure 8:
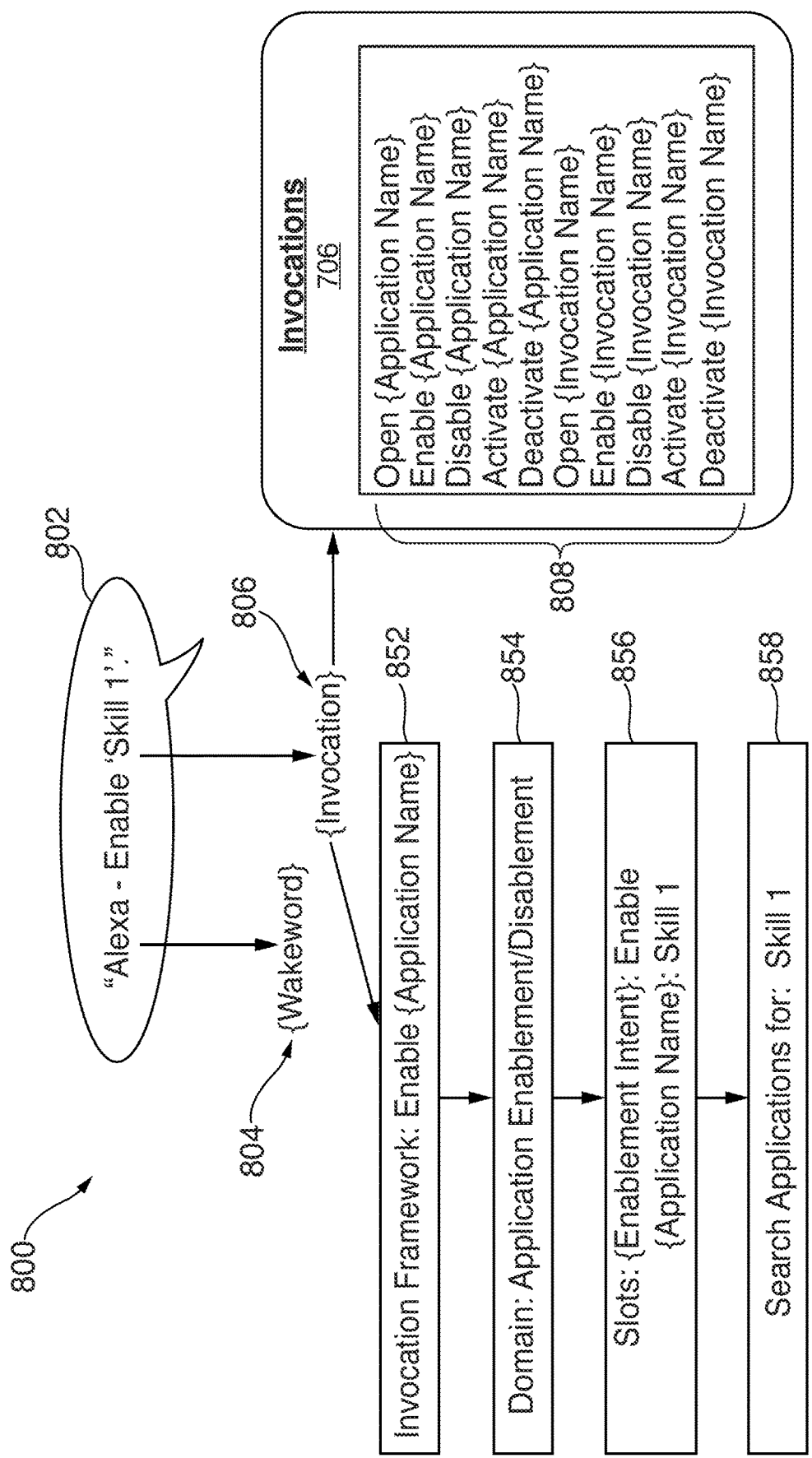
FIG. 8 is an illustrative diagram for determining that an utterance corresponds to an invocation, in accordance with various embodiments.

FIG. 8 is an illustrative diagram for determining that an utterance corresponds to an invocation, in accordance with various embodiments. Scenario 800, in one exemplary, non-limiting embodiment, includes an utterance 802, "Alexa—Enable 'Skill 1'." Utterance 802 may include a wakeword 804 (e.g., "Alexa") and an invocation 806 (e.g., "Enable 'Skill 1'."). In response to receiving invocation 806, NLU module 260 may access invocations database 706 including invocation frameworks 808. Each invocation framework stored therein may be associated with one exemplary sentence structure of that an invocation may have.

As an illustrative example, process 850 may detail a technique for determining an application with which to search for within applications module 262. At step 852, an invocation framework for invocation 806 may be determined from invocation frameworks 808. For example, invocation 806 may be compared against each invocation framework of invocations database 706, and a confidence score may be determined that indicates a confidence that a particular invocation framework matches a structure of invocation 806. For instance, a matching invocation framework for invocation 806 may be of the form: "Enable {Application Name}."

Using the determined invocation framework, an enablement intent of invocation 806 may be determined. For instance, for the invocation framework "Enable {Application Name}," the first word or phrase, "Enable" may correspond to the enablement intent, and the second word or phrase may correspond to an application name to be enabled/disabled. Therefore, because the first word is an enablement intent, at step 854, NLU module 260 may determine that application enablement domain 222 may be an appropriate domain to handle invocation 806. Invocation framework 808, may include a listing of possible invocation frameworks that may be associated with an invocation for enabling or disabling an application. Various enablement intent words or phrases may include, but are not limited to, "Open," "Enable," "Disable," "Activate," "Deactivate," "Add," "Remove," "Launch," and the like. At step 856, the various slots may be identified based on the invocation framework that was determined. For example, invocation 806 may have the format, "{Enablement Intent} {Application Name}," and therefore {Enablement Intent}: Enable, and {Application Name}: Skill 1. At step 858, applications having an application name corresponding to "Skill 1" may be searched for within applications module 262. For example, any applications within applications module that have an application name substantially similar to "Skill 1" may be identified to determine whether that application is an appropriate target application to handle invocation 806.

Figure 9:
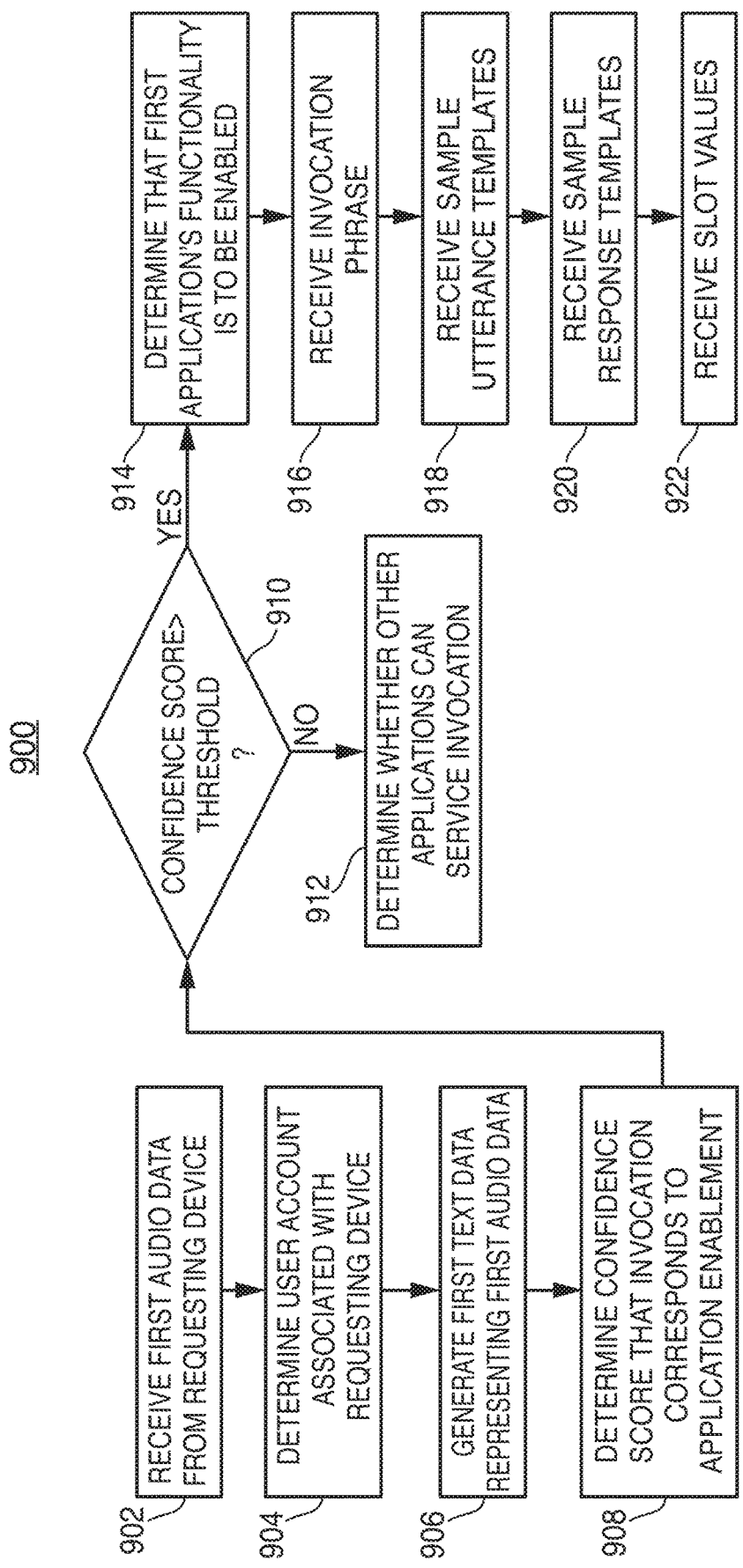
FIG. 9 is an illustrative flowchart of a process for enabling an application for a user account, in accordance with various embodiments.

FIG. 9 is an illustrative flowchart of a process for enabling an application for a user account, in accordance with various embodiments. Process 900, in some embodiments, may begin at step 902. At step 902, first audio data representing an utterance may be received by backend system 100 from a requesting device, such as electronic device 10. The first audio data may, for instance, correspond to an utterance to have an application, (e.g., certain functionalities and capabilities of backend system 100), be enabled. For example, the first audio data may represent utterance 802 of FIG. 8, "Alexa—Enable 'Skill 1'." At step 904, a user account associated with the requesting device may be determined. For example, electronic device 10 may be associated with a user account for individual 2. At step 906, first text data may be generated representing the first audio data. For example, ASR module 258, upon receipt of the first audio data, may use STT module 266 to execute speech-to-text functionality on the first audio data to generate the first text data. In some embodiments, steps 902, 904, and 906 of FIG. 9 may be substantially similar to steps 302, 304, 306, and 308 of FIG. 3, and the previous descriptions may apply.

At step 908, a confidence score may be determined that indicates a likelihood that an invocation of the utterance corresponds to enabling an application. For example, the first text data may include the verb, "Enable." IC module 274-A may recognize that the first text data includes the word "enable" and that Application Enablement domain 222 is capable of handling the invocation. An enablement identifier, in one embodiment, may correspond to a particular class or group of identifiers (e.g., identifiers 702) that indicate that the text data is associated with application enablement domain 222. An enablement identifier may correspond to one exemplary type of identifier. For instance, the identifier "Play" may be associated with a music or video domain, the identifier "Weather" may be associated with a weather domain, etc. Various types of enablement identifiers may include, but are not limited to, "enable," "disable," "activate," "deactivate," "run," "open," "close," and the like. As an illustrative example, if ASR module 258 outputs text including the word, "enable," then NLU module 260 may determine that the utterance include an intent to enable an application. In response to determining that the utterance included an enablement identifier, NLU module 260 may further determine that the utterance includes, or is, an invocation. For example, utterance 802, "Alexa—Enable 'Skill 1,'" may correspond to the invocation, "Enable 'Skill 1'."

At step 910 a determination may be made as to whether the confidence score for each invocation framework exceeds a predefined confidence score threshold. Continuing the previous examples, if the invocation is of the form, "{Enablement Intent} {Application Name}," then the invocation "Enable 'Skill 1'," may yield a confidence score of 100% or HIGH, however this is merely exemplary. If the invocation, however, is "Disable my weather application," then the confidence score may be low.

If, at step 910, it is determined that no confidence score is greater than the predefined confidence threshold, then process 900 may proceed to step 912. At step 912, one or more additional applications or domains may be queried to determine if they can service the invocation. However, if at step 910 it is determined that that one or more confidence scores are greater than the predefined confidence score threshold, then process 900 may proceed to step 914. At step 914, a determination may be made that the first application's functionality is to be enabled for the user account associated with the requesting device. Process 900 may then proceed to step 916, where a language model for an individual's user account may be updated. For instance, one or more invocation phrases may be received and the language model may be updated to include the invocation phrase(s). For example, invocations phrases associated with first application may be stored within NLU module 260 for the user account as part of the user accounts updated language model. In this way, if a subsequent utterance is determined to include one of the invocation phrases, then NLU module 260 may determine that the utterance is capable of being responded to using the first application.

At step 918, one or more sample utterance templates may be received and the user account's language model may further be updated to include the sample utterance template(s). For example, structural formats of sentences that an utterance may have that may be responded to using the first application may be added to NLU module 260. The sample utterance templates may, for instance, have the form, "{Invocation Phrase} {Object}," or "{Invocation Phrase} {Question}," and the like. The various sample utterance templates may each include a slot, or placeholder, which may correspond to a particular invocation phrase for the application. In this way, in response to determining that the first text data includes one of the invocation phrases, NLU module 260 may further determine which sample utterance template the invocation corresponds to.

At step 920, one or more sample response templates may be received and the user account's language model may be updated to include the sample response template(s). The sample response templates may correspond to various sentence structures or formats that may be used to respond to an invocation that is to be serviced by the first application. The sample response template(s) may include one or more slots or placeholders that may be replaced with one or more slot values, which may be received and added to the user account's language model at step 922.

Figure 10:
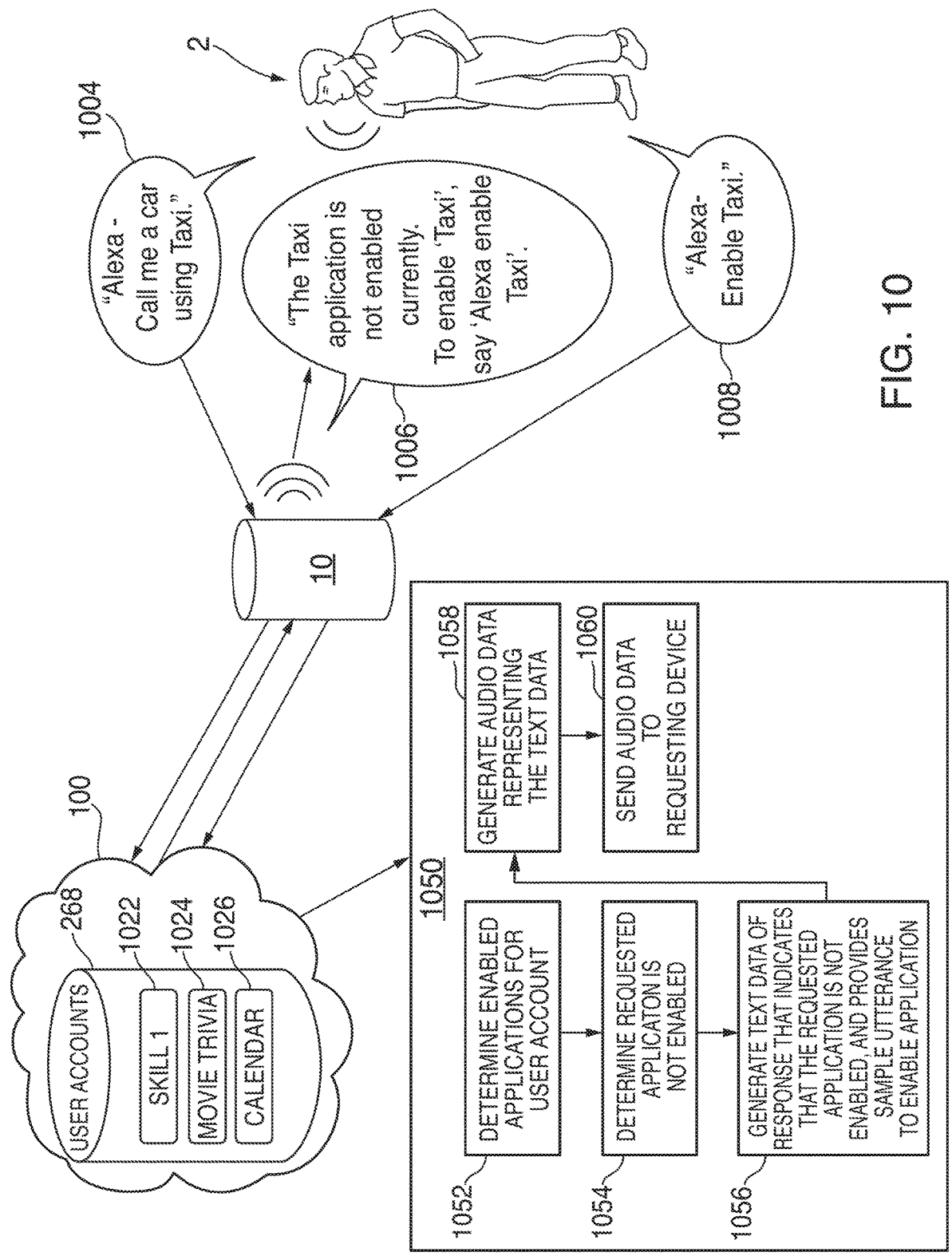
FIG. 10 is an illustrative diagram of a system for determining that an application needs to be enabled for an utterance, in accordance with various embodiments.

FIG. 10 is an illustrative diagram of a system for determining that an application needs to be enabled for an utterance, in accordance with various embodiments. In one non-limiting, example embodiment, an individual 2 may speak an utterance 1004, "Alexa—Call me a car using Taxi." Electronic device 10, in response to receiving utterance 1004 including the wakeword (e.g., "Alexa") may send audio data representing utterance 1004 to backend system 100. Upon receipt, backend system 100 may generate text data representing the audio data, determine an intent of utterance 1004 from the text data, and may attempt to determine an application that can service utterance 1004.

In some embodiments, backend system 100 may perform process 1050. At step 1052, NLU module 260 may access user accounts module 268 to determine which applications are currently enabled for a particular user account. For example, user accounts module 268 may include an applications module 282, which stores a listing of all the applications that are enabled for each user profile stored within user accounts module 268. For instance, the user account associated with electronic device 10 may have three applications currently enabled, Skill 1 application 1022, Movie Trivia application 1024, and Calendar application 1026. At step 1054, NLU module 260 may determine that the requested application, "Taxi," is not currently enabled for the user account.

Due to the requested application not being currently enabled, at step 1056, text data of a response may be received by TTS module 264 from NLU module 260, where the response indicates that the requested application is not current enabled. Furthermore, the response may also include an option for the individual operating the requesting device (e.g., individual 2 operating electronic device 10) to have the requested application enabled. For example, text data representing the response, "The Taxi application is not enabled currently. To enable 'Taxi', say 'Alexa enable 'Taxi'," may be received from NLU module 260 at TTS module 264. At step 1058, audio data representing the text data may be generated by TTS module, and at step 1060, the audio data may be sent to the requesting device. For instance, message 1006 may be sent to from backend system 100 to electronic device 10, such that electronic device 10 outputs message 1006 thereon. In response to message 1006, individual 2 may further say utterance 1008, "Alexa—Enable Taxi," which may cause the application, "Taxi," to be enabled for the individual's user account on backend system 100.

In some embodiments, an instruction may also be generated that causes the requesting device to continue sending audio data received after message 1006 is played. Furthermore, the instruction may be sent to the requesting device. For example, an audio message may be played, in response to utterance 1004, corresponding to "The Taxi application is not currently enabled. Would you like to enable Taxi?" In this particular scenario, individual 2 may further provide an additional utterance, "Yes," without necessarily requiring the wakeword, "Alexa," to be uttered. Therefore, the instruction may enable electronic device 10 to continue sending audio data of sounds captured by microphone(s) 208 after the audio message (e.g., message 1006) is played by speaker(s) 210 to determine the response of individual 2 such that individual 2 and backend system 100 are able to have a seemingly fluid and dynamic conversation.

Figure 11:
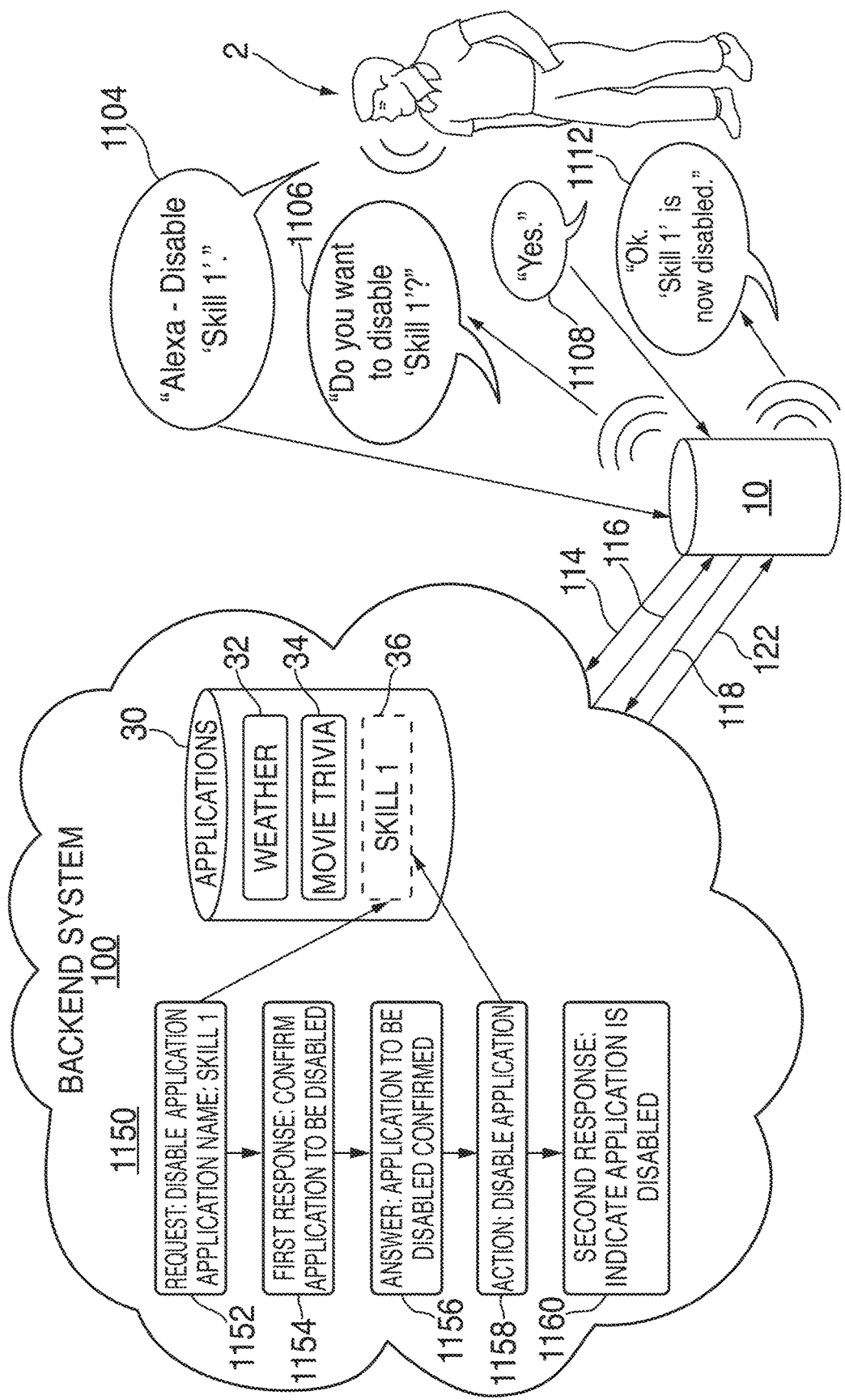
FIG. 11 is an illustrative diagram of a system for disabling an application using speech, in accordance with various embodiments.

FIG. 11 is an illustrative diagram of a system for disabling an application using speech, in accordance with various embodiments. In a non-limiting exemplary embodiment of FIG. 11, an individual 2 may, alternatively speak an utterance 1104, which may include a wakeword, to their electronic device 10. Utterance 1104 may, for instance, correspond to the invocation "Alexa—Disable 'Skill 1'." Upon detecting the wakeword, "Alexa," within utterance 104, electronic device 10 may send audio data 114 representing utterance 104 to backend system 100. Text data representing audio data 114 may then be generated using the automatic speech recognition functionality of backend system 100, and an intent of utterance 1104 may be determined, based on the text data, using the natural language understanding functionality of backend system 100. Backend system 100 may, in some embodiments, implement process 1150, which may be substantially similar to process 150, with the exception that process 1 corresponds to disabling an application. Process 1150 may begin at step 1152, where an enablement intent and an application name of an application to be disabled are determined. For instance, NLU module 260 may recognize that an enablement intent to disable an application may be within utterance 1104. Utterance 1104, for example, may have a format of "{Enablement Intent} {Application Name}," where {Enablement Intent} is "Disable," and {Application Name} is "Skill 1." Similarly to how a particular application is identified to be enabled based on the enablement intent and the application name determined to be within the utterance, an application may also be identified for disablement based on the enablement intent and the application name determined to be present within another utterance. Therefore, step 1152 of process 1150 may be substantially similar to step 152 of process 150, with the exception that the former is for disablement, while the latter corresponds to enablement.

In some embodiments, in response to determining that the application, "Skill 1," is to be enabled, one or more invocation phrases being removed from the individual's user account such that the invocation phrases may no longer be used for invoking the application. Furthermore, one or more sample utterance templates may be removed from the individual's user account such the NLU module is no longer capable of determining whether an additional utterance has a same format of one of the sample utterance templates for that application. Additionally, one or more sample response templates, including one or more response slots, fields, or placeholders, may be removed from the individual's user account such that the NLU module is no longer capable of selecting one of the sample response templates to use for responding to a subsequent utterance associated with that application. Still further, one or more slot, field, or placeholder values for the application, to be used with one of the application response slots, fields, or placeholders, may also be removed from the individual's user account.

In some embodiments, after the application to be disabled is determined, a confirmation response message may be determined from the listing of response message, at step 1154. For instance, text data representing a message asking, "Do you want to {Enablement Intent} {Application Name}?" may be obtained from the prompts module include the listing of response messages. Continuing the previous example, if the enablement intent is to disable an application, and the application name is "Skill 1," then the text data received may correspond to the message, "Do you want to disable 'Skill 1'?" In some embodiments, backend system 100 may generate audio data 116 representing this text data using the text-to-speech functionality of backend system 100, and may send audio data 116 to electronic device 10 such that audio message 1106, "Do you want to disable 'Skill 1'?" is played thereby.

In addition to sending audio data 116 to electronic device 10, backend system 100 may also generate an instruction that causes electronic device 10 to continue sending audio captured after audio message 1106 is played. In some embodiments, the instruction may cause a communications channel existing between electronic device 10 and backend system 100 to remain open, such that any audio data uttered by individual 2 in response to audio message 1106 may be sent to backend system 100. For instance, individual 2 may say an utterance 1108, "Yes." in response to audio message 1106. Thus, electronic device 10 may send audio data 118 representing utterance 108 to backend system 100. The instruction, however, may be optional, such that an individual 2 may need to say the wakeword again, or say the invocation again, in order to have that particular application be disabled. Furthermore, audio message 1106 may, alternatively, be, "Are you sure you want to disable 'Skill 1'?" Thus, in this particular scenario, individual 2 may need to say, "Alexa—Yes. Disable 'Skill 1'."

Backend system 100, in response to receiving audio data 118, may generate text data representing audio data 118 using the automatic speech recognition functionality, and may determine an intent of utterance 108 using the natural language understanding functionality, at step 1156. For example, utterance 108 may correspond to a confirmation from individual 2 that the application "Skill 1" is to be disabled. At step 1158, backend system 100 may cause the particular skill to be disabled for the user account associated with individual 2. For example, one or more invocation phrases, sample utterance templates, sample response templates, and/or slot values associated with the application to be disabled (e.g., "Skill 1"), may be removed from the user account.

Furthermore, in some embodiments, a second response may be selected that indicates to individual 2 that the application has, in fact, been disabled, at step 1160. For instance, the prompts module may select a response of the format, "Ok. {Application Name} is now {Enablement Intent}." Using the application name "Skill 1" and the enablement intent—disabled—the text data representing the response may be, "Ok. 'Skill 1' is now disabled." Backend system 100 may then generate audio data 122 representing the text data using the text-to-speech functionality, and may send audio data 122 to electronic device 10 such that an audio message 1'12 is output thereby. In some embodiments, process 1150 of FIG. 11 may be substantially similar to process 150 of FIG. 1B, with the exception that the former may correspond to disablement of an application, while the latter may correspond to enablement of an application. Similarly, process 1150 may be substantially similar to process 50 of FIG. 1A, such that in response to determining the application, and the request (e.g., disable 'Skill 1'), the application may be disabled for the user account associated within individual 2, and messages 1106 and 1112, and utterance 1108, may not be used.

The various embodiments of the invention may be implemented by software, but may also be implemented in hardware, or in a combination of hardware and software. The invention may also be embodied as computer readable code on a computer readable medium. The computer readable medium may be any data storage device that may thereafter be read by a computer system.

The above-described embodiments of the invention are presented for purposes of illustration and are not intended to be limiting. Although the subject matter has been described in language specific to structural feature, it is also understood that the subject matter defined in the appended claims is not necessarily limited to the specific features described. Rather, the specific features are disclosed as illustrative forms of implementing the claims.

What is claimed is:

1. A computer-implemented method, comprising:
   receiving first input data;
   processing, using a speech processing component, the first input data to determine that the first input data corresponds to a first command to enable future invocation of a first application, wherein, prior to receipt of the first input data, a voice interface of the first application was not enabled such that a response from the first application was unable to be invoked in response to a spoken user input;
   based at least in part on determining that the first input data corresponds to the first command, configuring an updated speech processing component to cause a first action of the first application to be performed in response to recognition of a first phrase, wherein configuring the updated speech processing component comprises enabling the voice interface for the first application;
   after configuring the updated speech processing component, receiving first audio data;
   processing the first audio data using the updated speech processing component to detect the first phrase; and
   based at least in part on detection of the first phrase, causing the first action to be performed by the first application.

2. The computer-implemented method of claim 1, further comprising:
   prior to receiving the first input data, receiving a request to operate the voice interface of the first application; and
   after receiving the request to operate the voice interface of the first application, presenting a prompt to enable the future invocation of the first application,
   wherein the first input data is received after presenting the prompt.

3. The computer-implemented method of claim 2, wherein causing the first action to be performed comprises invoking a first response from the first application.

4. The computer-implemented method of claim 1, wherein the first input data corresponds to a touch input.

5. The computer-implemented method of claim 1, wherein the first input data is received by a first device associated with a first user account and the method further comprises:
   associating the updated speech processing component with the first user account.

6. The computer-implemented method of claim 1, further comprising, after configuring the updated speech processing component:
   receiving second input data;
   determining that the second input data corresponds to a second command to disable the future invocation of the first application; and
   based at least in part on the second input data corresponding to the second command, configuring a further updated speech processing component.

7. The computer-implemented method of claim 1, further comprising:
   receiving the first input data from a first device;
   determining that a first speech processing component is associated with the first device;
   configuring the updated speech processing component at least in part by updating the first speech processing component;
   receiving the first audio data from the first device; and
   determining that the updated speech processing component is associated with the first device.

8. The computer-implemented method of claim 1, further comprising:
   determining at least one word associated with the first input data,
   wherein configuring the updated speech processing component causes the at least one word to be associated with the first action.

9. A system comprising:
   at least one processor; and
   at least one memory comprising instructions that, when executed by the at least one processor, cause the system to:
   receive first input data;
   processing, using a speech processing component, the first input data to determine that the first input data corresponds to a first command to enable future invocation of a first application, wherein, prior to receipt of the first input data, a voice interface of the first application was not enabled such that a response from the first application was unable to be invoked in response to a spoken user input;
   based at least in part on determining that the first input data corresponds to the first command, configure an updated speech processing component to cause a first action of the first application to be performed in response to recognition of a first phrase, wherein configuring the updated speech processing component comprises enabling the voice interface for the first application;
   after configuration of the updated speech processing component, receive first audio data;
   process the first audio data using the updated speech processing component to detect the first phrase; and
   based at least in part on detection of the first phrase, cause the first action to be performed by the first application.

10. The system of claim 9, wherein the at least one memory further comprises instructions that, when executed by the at least one processor, further cause the system to:
    prior to receiving the first input data, receive a request to operate the voice interface of the first application; and
    after receiving the request to operate the voice interface of the first application, present a prompt to enable the future invocation of the first application,
    wherein the first input data is received after presentation of the prompt.

11. The system of claim 10, wherein the instructions that cause the first action to be performed comprise instructions that, when executed by the at least one processor, cause the system to invoke a first response from the first application.

12. The system of claim 10, wherein the first input data corresponds to a touch input.

13. The system of claim 9, wherein the first input data is received by a first device associated with a first user account and wherein the at least one memory further comprises instructions that, when executed by the at least one processor, further cause the system to:
associate the updated speech processing component with the first user account.

14. The system of claim 9, wherein the at least one memory further comprises instructions that, when executed by the at least one processor, further cause the system to, after configuration of the updated speech processing component:
receive second input data;
determine that the second input data corresponds to a second command to disable the future invocation of the first application; and
based at least in part on the second input data corresponding to the second command, configure a further updated speech processing component.

15. The system of claim 9, wherein the at least one memory further comprises instructions that, when executed by the at least one processor, further cause the system to:
receive the first input data from a first device;
determine that a first speech processing component is associated with the first device;
configure the updated speech processing component at least in part by updating the first speech processing component;
receive the first audio data from the first device; and
determine that the updated speech processing component is associated with the first device.

16. The system of claim 9, wherein the at least one memory further comprises instructions that, when executed by the at least one processor, further cause the system to:
determine at least one word associated with the first input data,
wherein the instructions that cause the system to configure the updated speech processing component cause the at least one word to be associated with the first action.

\* \* \* \* \*